United States Patent
Oh et al.

(10) Patent No.: US 12,204,718 B2
(45) Date of Patent: Jan. 21, 2025

(54) ELECTRONIC DEVICE, A SENSOR DRIVING UNIT, AND AN ELECTRONIC DEVICE DRIVING METHOD

(71) Applicant: Samsung Display Co., Ltd., Yongin-Si (KR)

(72) Inventors: Yerin Oh, Yongin-si (KR); Taejoon Kim, Yongin-si (KR); Jinwoo Park, Yongin-si (KR); Seungrok Lee, Yongin-si (KR); Il Ho Lee, Yongin-si (KR); Wankee Jun, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/397,060

(22) Filed: Dec. 27, 2023

(65) Prior Publication Data

US 2024/0288966 A1    Aug. 29, 2024

(30) Foreign Application Priority Data

Feb. 28, 2023    (KR) ........................ 10-2023-0026437

(51) Int. Cl.
*G06F 3/041*    (2006.01)
*G06F 3/044*    (2006.01)

(52) U.S. Cl.
CPC ........ *G06F 3/04166* (2019.05); *G06F 3/0446* (2019.05)

(58) Field of Classification Search
CPC ... G06F 3/04166; G06F 3/0446; G06F 3/0418
See application file for complete search history.

(56) References Cited

U.S. PATENT DOCUMENTS

| | | | |
|---|---|---|---|
| 9,645,639 B2 | 5/2017 | Jang et al. | |
| 2012/0056851 A1* | 3/2012 | Chen | G06F 3/0418 |
| | | | 345/173 |
| 2022/0137743 A1* | 5/2022 | Lim | G09G 3/3266 |
| | | | 345/174 |

FOREIGN PATENT DOCUMENTS

| | | | | |
|---|---|---|---|---|
| CN | 102402316 B | * | 4/2015 | .......... G06F 3/0418 |
| KR | 10-1385481 | | 4/2014 | |
| KR | 101416724 B1 | * | 7/2014 | |
| KR | 10-1461036 | | 11/2014 | |
| KR | 20180074880 A | * | 7/2018 | |
| KR | 10-2020-0101255 | | 8/2020 | |

(Continued)

*Primary Examiner* — Ricardo Osorio
(74) *Attorney, Agent, or Firm* — F. CHAU & ASSOCIATES, LLC

(57) ABSTRACT

An electronic device including: a display layer; a sensor layer disposed on the display layer; a memory configured to store first sensitivity values and first differential sensitivity values; and a sensor driver configured to calculate second sensitivity values from a plurality of nodes and to calculate second differential sensitivity values, wherein the sensor driver is configured to: calculate difference values between the first differential sensitivity values and the second differential sensitivity values; calculate a first average value of a first row or column of values among the difference values; and calculate a second average value of remaining values among the difference values, wherein the remaining values were not used in the first average value calculation, and wherein the sensor driver determines whether to update a baseline, based on the first average value and the second average value.

17 Claims, 11 Drawing Sheets

(56) References Cited

FOREIGN PATENT DOCUMENTS

| KR | 10-2020-0101265 | | 8/2020 | | |
| KR | 20210044346 | A * | 4/2021 | | |
| WO | WO-2013190857 | A1 * | 12/2013 | ........... | G06F 3/0418 |

* cited by examiner

CROSS-REFERENCE TO RELATED APPLICATION

This application claims priority under 35 U.S.C. § 119 to Korean Patent Application No. 10-2023-0026437 filed on Feb. 28, 2023, in the Korean Intellectual Property Office, the disclosure of which is incorporated by reference herein in its entirety.

TECHNICAL FIELD

Embodiments of the present disclosure described herein relate to an electronic device with improved sensing reliability, a sensor driver, and a method for driving the electronic device.

DISCUSSION OF RELATED ART

Electronic multimedia devices such as TVs, mobile phones, tablets, navigation systems, game consoles, and others, can display images. Beyond conventional input methods such as buttons, keyboards, or mice, electronic multimedia devices often offer touch-based input methods, enabling users to input information or commands in an intuitive manner.

SUMMARY

Embodiments of the present disclosure provide an electronic device having improved sensing reliability, a sensor driver, and a method for driving the electronic device.

According to an embodiment of the present disclosure, there is provided an electronic device including: a display layer configured to display an image; a sensor layer disposed on the display layer and including a plurality of electrodes arranged in a first direction and a plurality of cross electrodes arranged in a second direction crossing the first direction; a memory configured to store a plurality of first sensitivity values and a plurality of first differential sensitivity values, wherein the plurality of first sensitivity values are calculated from a plurality of nodes respectively provided in areas where the plurality of electrodes intersect the plurality of cross electrodes in a first environment, and the plurality of first differential sensitivity values are calculated from a difference between first sensitivity values, which are adjacent to each other, from among the plurality of first sensitivity values; and a sensor driver configured to calculate a plurality of second sensitivity values from the plurality of nodes in a second environment and to calculate a plurality of second differential sensitivity values, wherein the plurality of second differential values are calculated from a difference between second sensitivity values, which are adjacent to each other, from among the plurality of second sensitivity values, wherein the sensor driver is configured to: calculate a plurality of difference values between the plurality of first differential sensitivity values and the plurality of second differential sensitivity values, respectively; calculate a first average value of a first row or column of values among the plurality of difference values; and calculate a second average value of remaining values among the plurality of difference values, wherein the remaining values were not used in the first average value calculation, and wherein the sensor driver determines whether to update a baseline, based on the first average value and the second average value.

The sensor driver determines whether there is a touch, by comparing a signal sensed in the sensor layer with the baseline.

The first environment is an environment having a first temperature, and the second environment is an environment having a second temperature different from the first temperature.

When an absolute value of the first average value is greater than a predetermined first threshold value, and an absolute value of the second average value is less than a predetermined second threshold value, the sensor driver updates the baseline.

When the absolute value of the first average value is less than or equal to the first threshold value, the sensor driver does not update the baseline.

When the absolute value of the second average value is greater than or equal to the second threshold value, the sensor driver does not update the baseline.

The sensor driver determines a temperature change of the sensor layer based on the first average value.

The sensor driver determines whether there is a touch of the sensor layer, based on the second average value.

When the temperature change is determined, and the touch is not sensed, the sensor driver updates the baseline.

According to an embodiment of the present disclosure, there is provided a sensor driver configured to drive a sensor layer including a plurality of electrodes and a plurality of cross electrodes respectively intersecting the plurality of electrodes, the sensor driver including: a sensitivity value receiver configured to calculate a plurality of sensitivity values and a plurality of differential sensitivity values, wherein the plurality of sensitivity values are calculated from a plurality of nodes respectively provided in areas where the plurality of electrodes intersect the plurality of cross electrodes, and the plurality of differential sensitivity values are calculated from a difference between sensitivity values adjacent to each other from among the plurality of sensitivity values; an average value calculator configured to: calculate a plurality of difference values between a plurality of first differential sensitivity values calculated in a first environment among the plurality of differential sensitivity values, and a plurality of second differential sensitivity values calculated in a second environment different from the first environment among the plurality of differential sensitivity values; calculate a first average value of a first row or column of values among the plurality of difference values; and calculate a second average value of remaining values among the plurality of difference values, wherein the remaining values were not used in the first average value calculation; and a baseline updater configured to determine whether to update a baseline, based on the first average value and the second average value.

When an absolute value of the first average value is greater than a predetermined first threshold value, and an absolute value of the second average value is less than a predetermined second threshold value, the baseline updater updates the baseline.

When the absolute value of the first average value is less than or equal to the first threshold value, the baseline updater does not update the baseline.

When the absolute value of the second average value is greater than or equal to the second threshold value, the baseline updater does not update the baseline.

The baseline updater determines a temperature change of the sensor layer based on the first average value.

The baseline updater determines whether there is a touch of the sensor layer, based on the second average value.

When the temperature change is determined, and the touch is not sensed, the baseline updater updates the baseline.

According to an embodiment of the present disclosure, there is provided a driving method of an electronic device, the method including: measuring, by a sensor layer including a plurality of electrodes and a plurality of cross electrodes respectively intersecting the plurality of electrodes, a plurality of first sensitivity values calculated from a plurality of nodes provided in areas where the plurality of electrodes intersect the plurality of cross electrodes in a first environment; storing a plurality of first differential sensitivity values calculated from a difference between first sensitivity values adjacent to each other from among the plurality of first sensitivity values; measuring a plurality of second sensitivity values from the plurality of nodes in a second environment different from the first environment and calculating a plurality of second differential sensitivity values, wherein the plurality of second differential sensitivity values are calculated from a difference between second sensitivity values, which are adjacent to each other, from among the plurality of second sensitivity values; calculating a plurality of difference values between the plurality of first differential sensitivity values and the plurality of second differential sensitivity values, respectively, and calculating a first average value of a first row or column of values among the plurality of difference values and a second average value of remaining values among the plurality of difference values, wherein the remaining values were not used in the first average value calculation; and determining whether to update a baseline, based on the first average value and the second average value.

The determining of whether to update the baseline includes when an absolute value of the first average value is greater than a predetermined first threshold value, and an absolute value of the second average value is less than a predetermined second threshold value, updating the baseline.

The determining of whether to update the baseline further includes when the absolute value of the first average value is less than or equal to the first threshold value, not updating the baseline.

The determining of whether to update the baseline further includes when the absolute value of the second average value is greater than or equal to the second threshold value, not updating the baseline.

BRIEF DESCRIPTION OF THE DRAWINGS

The above and other features of the present disclosure will become apparent by describing in detail embodiments thereof with reference to the accompanying drawings.

DETAILED DESCRIPTION OF THE EMBODIMENTS

Figure 1:
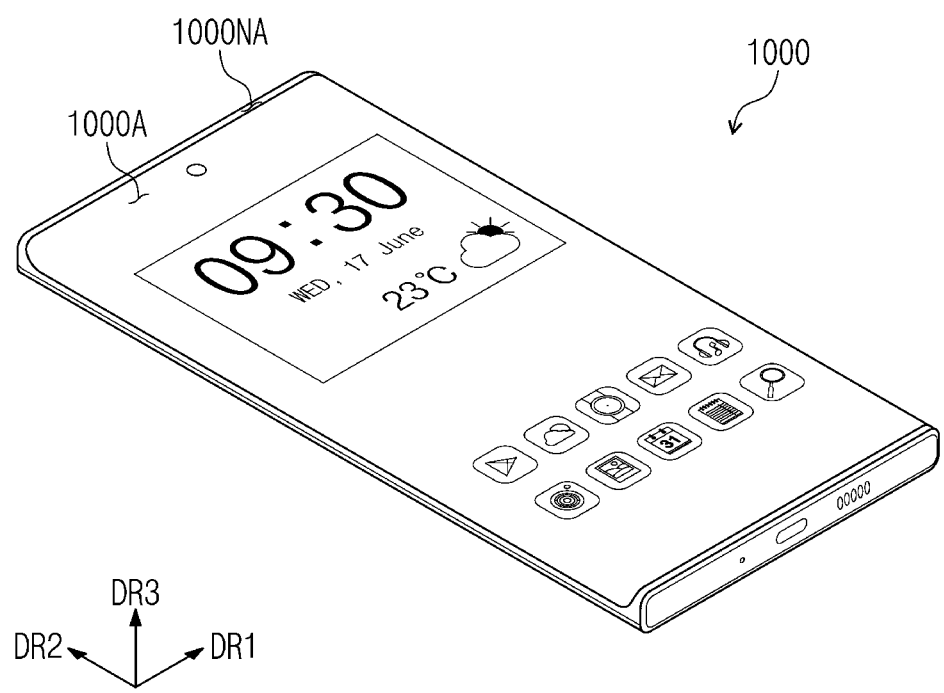
FIG. 1 is a perspective view of an electronic device, according to an embodiment of the present disclosure.

In the specification, the expression that a first component (or region, layer, part, portion, etc.) is "on", "connected with", or "coupled with" a second component may mean that the first component is directly on, connected with, or coupled with the second component or that a third component is interposed therebetween.

The same reference numerals may refer to the same components. Additionally, in drawings, the thickness, ratio, and dimension of components may be exaggerated for a more effective description of the technical contents illustrated therein. The term "and/or" includes one or more combinations in each of which associated elements are defined.

Although the terms "first", "second", etc. may be used to describe various components, the components should not be construed as being limited by the terms. The terms are used to distinguish one component from another component. For example, a first component may be referred to as a second component, and similarly, the second component may be referred to as the first component. The articles "a," "an," and "the" are singular in that they have a single referent, but the use of the singular form in the specification should not preclude the presence of more than one referent.

Additionally, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, and do not preclude the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in commonly used dictionaries should be interpreted as having a meaning consistent with their meaning in the context of the related technology, and should not be interpreted in an ideal or overly formal sense unless explicitly defined herein.

Hereinafter, embodiments of the present disclosure will be described with reference to the accompanying drawings.

FIG. 1 is a perspective view of an electronic device, according to an embodiment of the present disclosure.

Referring to FIG. 1, an electronic device 1000 may be a device activated depending on an electrical signal. In other words, the electronic device 1000 can be activated based on an electrical signal. For example, the electronic device 1000 may be a mobile phone, a foldable mobile phone, a notebook computer, a television, a tablet personal computer (PC), a car navigation system, a game console, or a wearable device, but is not limited thereto. FIG. 1 illustrates that the electronic device 1000 is a mobile phone.

An active area 1000A and a peripheral area 1000NA may be provided in the electronic device 1000. The electronic device 1000 may display an image through the active area 1000A. The active area 1000A may include a surface formed by a first direction DR1 and a second direction DR2. The peripheral area 1000NA may surround all or part of the active area 1000A.

A thickness direction of the electronic device 1000 may be parallel to a third direction DR3 intersecting the first direction DR1 and the second direction DR2. Accordingly, front surfaces (or upper surfaces) and back surfaces (or lower surfaces) of members constituting the electronic device 1000 may be defined with respect to the third direction DR3.

In FIG. 1, a bar-type electronic device 1000 is illustrated as an example, but the present disclosure is not limited thereto. For example, descriptions given below may be applied to various electronic devices such as a foldable electronic device 1000, a rollable electronic device 1000, or a slideable electronic device 1000.

Figure 2:
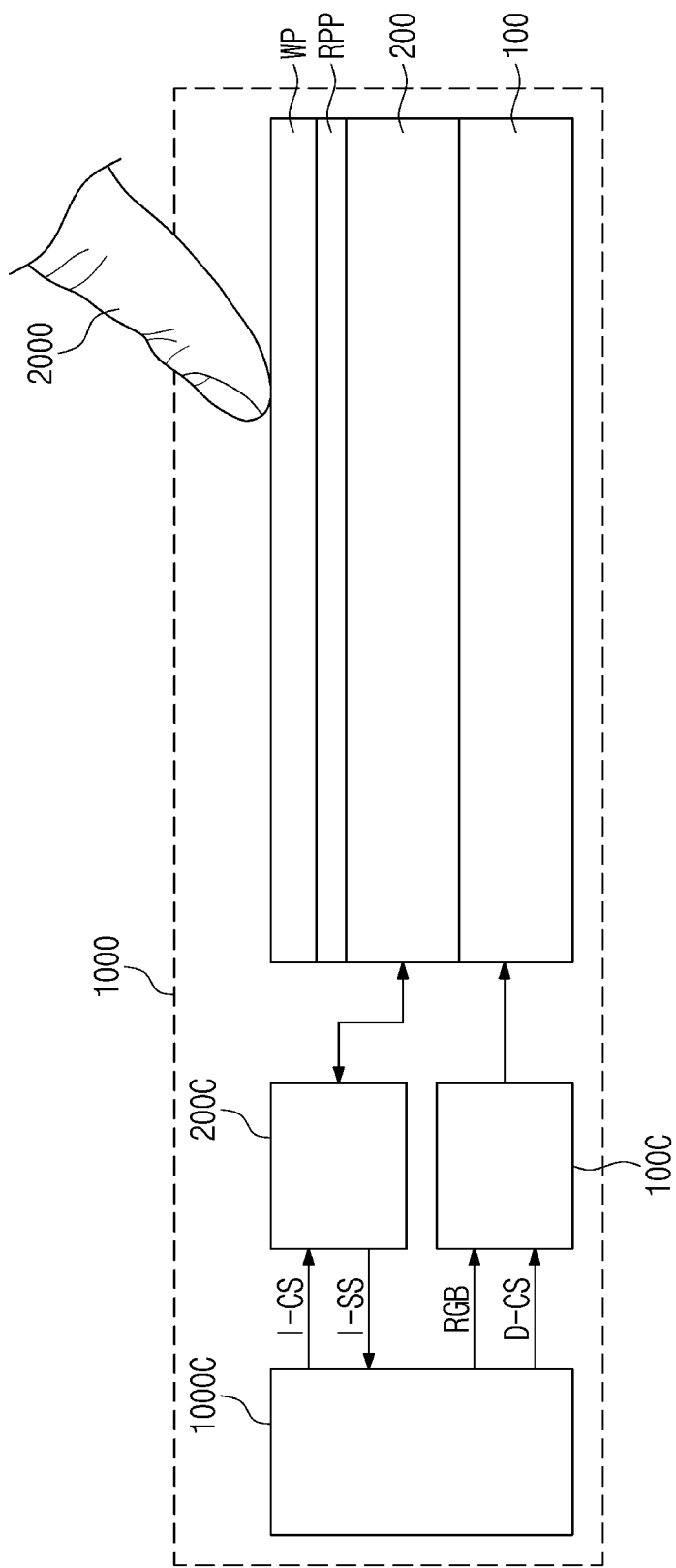
FIG. 2 is a block diagram of an electronic device, according to an embodiment of the present disclosure.

FIG. 2 is a block diagram of an electronic device, according to an embodiment of the present disclosure.

Referring to FIG. 2, the electronic device 1000 may include a window WP, an anti-reflection layer RPP, a display layer 100, a sensor layer 200, a display driver 100C, a sensor driver 200C, and a main driver 1000C. The window WP, the anti-reflection layer RPP, the sensor layer 200 and the display layer 100 may be sequentially stacked.

The display layer 100 may be a component that substantially generates an image. In other words, the display layer 100 might be the component primarily responsible for generating an image. The display layer 100 may be a light emitting display layer. For example, the display layer 100 may be an organic light emitting display layer, an inorganic light emitting display layer, an organic-inorganic light emitting display layer, a quantum dot display layer, a micro-light emitting diode (LED) display layer, or a nano-LED display layer.

The sensor layer 200 may be disposed on the display layer 100. The sensor layer 200 may sense an external input 2000 applied from the outside. The external input 2000 may include any input means capable of providing a change in capacitance. For example, the sensor layer 200 may sense not only a passive-type input means such as a user's body, but also an input by an active-type input means that provides a driving signal. The active-type input may be an electronic pen.

The anti-reflection layer RPP may be disposed on the sensor layer 200. The anti-reflection layer RPP may reduce the reflectance of natural light (or sunlight) incident from above the window WP.

The anti-reflection layer RPP according to an embodiment of the present disclosure may include a phase retarder and a polarizer. The phase retarder may be a film type or a liquid crystal coating type and may include a $\lambda/2$ phase retarder and/or a $\lambda/4$ phase retarder. The polarizer may be a polarizer of a film type or a liquid crystal coating type. The film type may include a stretch-type synthetic resin film, and the liquid crystal coating type may include liquid crystals arranged in a given direction. Each of the phase retarder and the polarizer may further include a protective film. The phase retarder and polarizer themselves may be referred to as a base layer of the anti-reflection layer RPP. Alternatively, the protective film may be referred to as the base layer of the anti-reflection layer RPP. However, this is an example and the anti-reflection layer RPP according to an embodiment of the present disclosure may be omitted.

The window WP may be disposed on the anti-reflection layer RPP. The window WP may constitute an appearance of the electronic device 1000. The window WP may protect internal configurations of the electronic device 1000 from external impacts, and may be a configuration that substantially provides the active area 1000A (see FIG. 1) of the electronic device 1000. For example, the window WP may include a glass substrate, a sapphire substrate, or a plastic film. The window WP may have a multi-layer structure or a single-layer structure. For example, the window WP may have a stacked structure of a plurality of plastic films bonded by an adhesive or may have a stacked structure of a glass substrate and a plastic film bonded by an adhesive.

The main driver 1000C may control overall operations of the electronic device 1000. For example, the main driver 1000C may control operations of the display driver 100C and the sensor driver 200C. The main driver 1000C may include at least one microprocessor, and the main driver 1000C may be referred to as a "host". The main driver 1000C may further include a graphic controller.

The display driver 100C may drive the display layer 100. The display driver 100C may receive image data RGB and a control signal D-CS from the main driver 1000C. The control signal D-CS may include various signals. For example, the control signal D-CS may include an input vertical synchronization signal, an input horizontal synchronization signal, a main clock, and a data enable signal. The display driver 100C may generate a vertical synchronization signal and a horizontal synchronization signal for controlling timing for providing a signal to the display layer 100, based on the control signal D-CS. In other words, the display driver 100C can generate both vertical and horizontal synchronization signals to control the timing of signals sent to the display layer 100, based on the control signal D-CS.

The sensor driver 200C may drive the sensor layer 200. The sensor driver 200C may receive a control signal I-CS from the main driver 1000C. The control signal I-CS may include a clock signal or a mode determination signal for determining a driving mode of the sensor driver 200C.

The sensor driver 200C may calculate coordinate information of an input based on a signal received from the sensor layer 200 and may provide the main driver 1000C with a coordinate signal I-SS having the coordinate information. The main driver 1000C executes an operation corresponding to a user input based on the coordinate signal I-SS. For example, the main driver 1000C may operate the display driver 100C to display a new application image on the display layer 100 based on the coordinate signal I-SS.

Figure 3A:
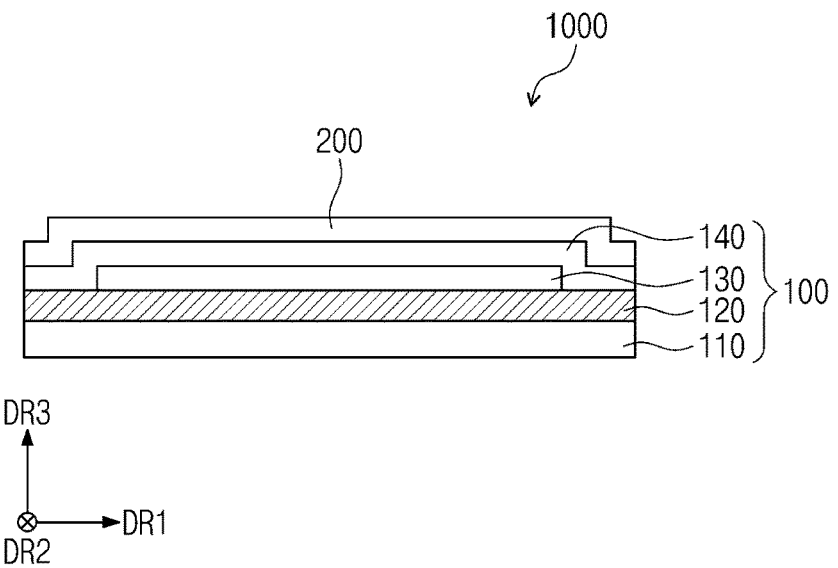
FIG. 3A is a cross-sectional view of an electronic device, according to an embodiment of the present disclosure.

FIG. 3A is a cross-sectional view of an electronic device, according to an embodiment of the present disclosure.

Referring to FIG. 3A, the display layer 100 may include a base layer 110, a circuit layer 120, a light emitting element layer 130, and an encapsulation layer 140. The base layer 110, the circuit layer 120, the light emitting element layer 130, and the encapsulation layer 140 may be sequentially stacked.

The base layer 110 may be a member that provides a base surface on which the circuit layer 120 is disposed. The base layer 110 may be a glass substrate, a metal substrate, a polymer substrate, or the like. However, an embodiment is not limited thereto, and the base layer 110 may be an inorganic layer, an organic layer, or a composite material layer.

The circuit layer 120 may be disposed on the base layer 110. The circuit layer 120 may include an insulating layer, a semiconductor pattern, a conductive pattern, and a signal wire. The insulating layer, the semiconductor layer, and the conductive layer may be formed on the base layer 110 in a manner such as coating, evaporation, or the like. Afterward, the insulating layer, the semiconductor layer, and the conductive layer may be selectively patterned by performing a photolithography process multiple times. Afterward, the semiconductor pattern, the conductive pattern, and the signal wire included in the circuit layer 120 may be formed.

The light emitting element layer 130 may be disposed on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be disposed on the light emitting element layer 130. The encapsulation layer 140 may also be disposed on the circuit layer 120. The encapsulation layer 140 may protect the light emitting element layer 130 from foreign substances such as moisture, oxygen, and dust particles.

The sensor layer 200 may be disposed on the display layer 100. The sensor layer 200 may sense an external input applied from the outside. The external input may be a user input. The user input may include various types of external inputs such as a part of a user body, light, heat, a pen, or pressure.

The sensor layer 200 may be formed on the display layer 100 through a successive process. In this case, the sensor layer 200 may be expressed as being directly disposed on the display layer 100. "Being directly disposed" may mean that the third component is not interposed between the sensor layer 200 and the display layer 100. In other words, a separate adhesive member may not be interposed between the sensor layer 200 and the display layer 100. Alternatively, the sensor layer 200 may be coupled to the display layer 100 through an adhesive member. The adhesive member may include a common adhesive or a common sticking agent.

The electronic device 1000 may further include an anti-reflection layer and an optical layer, which are disposed on the sensor layer 200. The anti-reflection layer may reduce the reflectance of external light incident from the outside of the electronic device 1000. The optical layer may improve the front luminance of the electronic device 1000 by controlling a direction of light incident from the display layer 100.

Figure 3B:
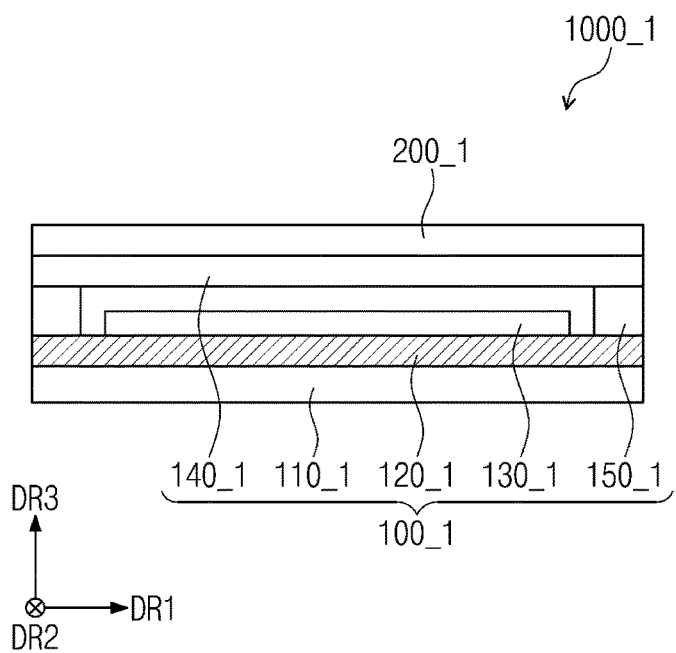
FIG. 3B is a cross-sectional view of an electronic device, according to an embodiment of the present disclosure.

FIG. 3B is a cross-sectional view of an electronic device, according to an embodiment of the present disclosure.

Referring to FIG. 3B, an electronic device 1000_1 may include a display layer 100_1 and a sensor layer 200_1. The display layer 100_1 may include a base substrate 110_1, a circuit layer 120_1, a light emitting element layer 130_1, an encapsulation substrate 140_1, and a coupling member 150_1.

Each of the base substrate 110_1 and the encapsulation substrate 140_1 may be a glass substrate, a metal substrate, or a polymer substrate, but is not particularly limited thereto.

The coupling member 150_1 may be interposed between the base substrate 110_1 and the encapsulation substrate 140_1. An empty space may be formed between the encapsulation substrate 140_1 and the light emitting element layer 130_1 where the coupling member 150_1 is not provided. The coupling member 150_1 may couple the encapsulation substrate 140_1 to the base substrate 110_1 or the circuit layer 120_1. The coupling member 150_1 may include an inorganic material or an organic material. For example, the inorganic material may include a frit seal, and the organic material may include a photo-curable resin or a photo-plastic resin. However, the material constituting the coupling member 150_1 is not limited to the example.

The sensor layer 200_1 may be directly disposed on the encapsulation substrate 140_1. "Being directly disposed" may mean that the third component is not interposed between the sensor layer 200_1 and the encapsulation substrate 140_1. In other words, a separate adhesive member may not be interposed between the sensor layer 2001 and the display layer 100_1. However, an embodiment is not limited thereto, and an adhesive layer may be further interposed between the sensor layer 200_1 and the encapsulation substrate 140_1.

Figure 4:
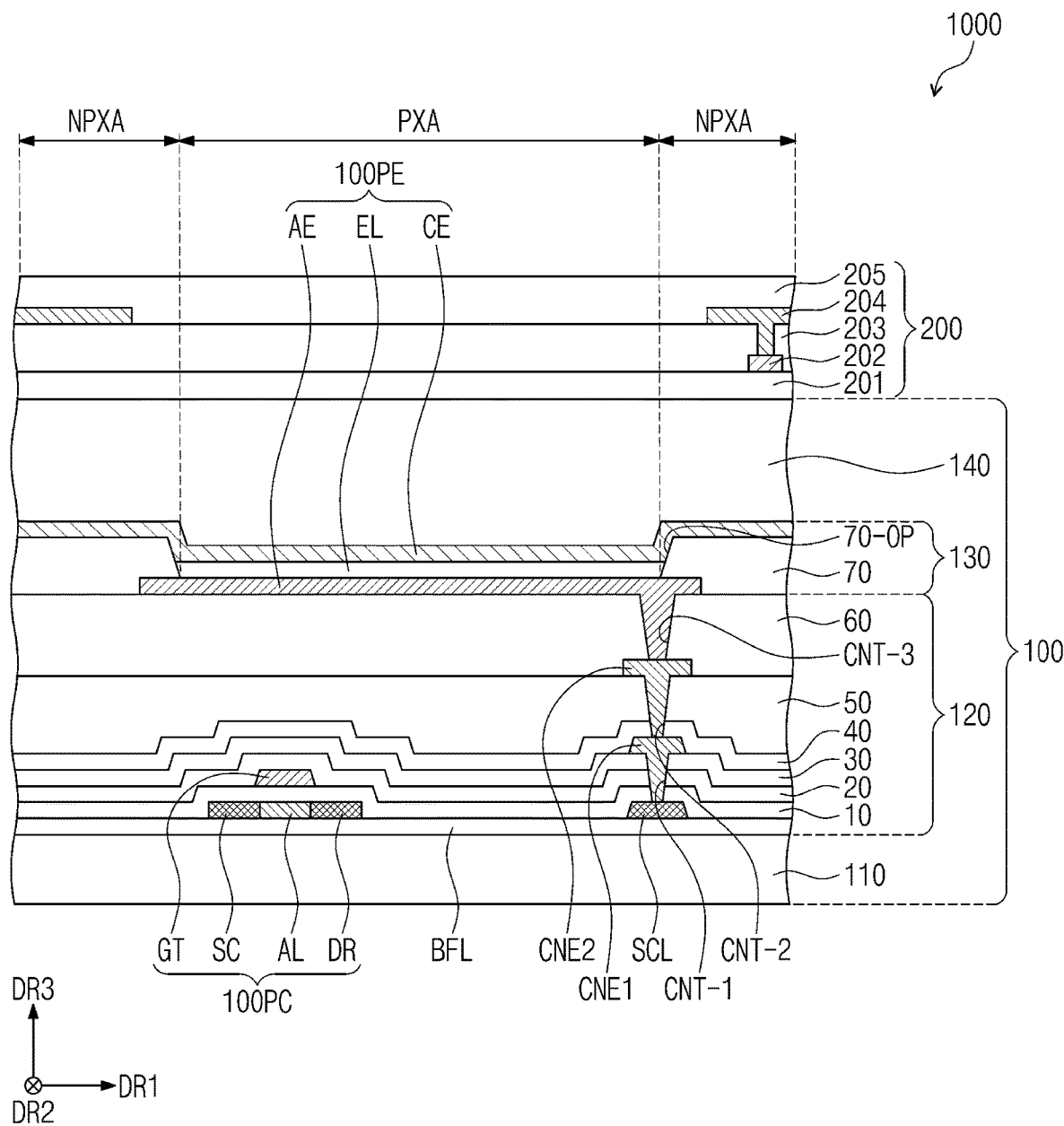
FIG. 4 is a cross-sectional view of an electronic device, according to an embodiment of the present disclosure.

FIG. 4 is a cross-sectional view of an electronic device, according to an embodiment of the present disclosure.

Referring to FIG. 4, at least one inorganic layer is formed on the upper surface of the base layer 110. The inorganic layer may include at least one of aluminum oxide, titanium oxide, silicon oxide, silicon nitride, silicon oxynitride, zirconium oxide, and hafnium oxide. The inorganic layer may be formed of multiple layers. The multiple inorganic layers may constitute a barrier layer and/or a buffer layer. In an embodiment, the display layer 100 is illustrated as including a buffer layer BFL.

The buffer layer BFL may improve a bonding force between the base layer 110 and a semiconductor pattern. The buffer layer BFL may include at least one of silicon oxide, silicon nitride, and silicon oxy nitride. For example, the buffer layer BFL may include a structure in which a silicon oxide layer and a silicon nitride layer are stacked alternately.

The semiconductor pattern may be disposed on the buffer layer BFL. The semiconductor pattern may include polysilicon. However, an embodiment is not limited thereto. For example, the semiconductor pattern may include amorphous silicon, low-temperature polycrystalline silicon, or an oxide semiconductor.

FIG. 4 only illustrates a part of the semiconductor pattern, and the semiconductor pattern may be further disposed in another area. The semiconductor pattern may be arranged according to a specific rule across pixels. The semiconductor pattern may have electrical characteristics that differ depending on whether the semiconductor pattern is doped. The semiconductor pattern may include a first area having high conductivity and a second area having low conductivity. The first area may be doped with an N-type dopant or a P-type dopant. A P-type transistor may include an area doped with the P-type dopant, and an N-type transistor may include an area doped with the N-type dopant. The second area may be an undoped area or an area doped with a concentration lower than a concentration in the first area.

A conductivity of the first area is greater than a conductivity of the second area. The first area may serve as an electrode or a signal wire. The second area may correspond to an active (or a channel) of a transistor. In other words, a part of the semiconductor pattern may be an active of the transistor. Another part of the semiconductor pattern may be a source or drain of the transistor. Yet another part of the semiconductor pattern may be a connection electrode or a connection signal wire.

Each of pixels may be expressed by an equivalent circuit including seven transistors, one capacitor, and a light emitting element, and the equivalent circuit of the pixel may be modified in various forms. One transistor 100PC and the one light emitting element 100PE included in a pixel are illustrated in FIG. 4 by way of example.

A source area SC, an active area AL, and a drain area DR of the transistor 100PC may be formed from the semiconductor pattern. The source area SC and the drain area DR may extend in directions opposite to each other from the active area AL in a cross-sectional view. A part of a connection signal wire SCL formed from the semiconductor pattern is illustrated in FIG. 4. The connection signal wire SCL may be connected to the drain area DR of the transistor 100PC in a plan view.

A first insulating layer 10 may be disposed on the buffer layer BFL. The first insulating layer 10 may overlap a plurality of pixels in common and may cover the semiconductor pattern. The first insulating layer 10 may be an inorganic layer and/or an organic layer, and may have a single layer structure or a multi-layer structure. The first insulating layer 10 may include at least one of an aluminum oxide, a titanium oxide, a silicon oxide, silicon nitride, a silicon oxynitride, a zirconium oxide, and a hafnium oxide. In an embodiment, the first insulating layer 10 may be a silicon oxide layer having a single layer structure. Not only the first insulating layer 10 but also an insulating layer of the circuit layer 120 to be described later may be an inorganic layer and/or an organic layer, and may have a single layer structure or a multi-layer structure. The inorganic layer may include at least one of the above-described materials, but is not limited thereto.

A gate GT of the transistor 100PC is disposed on the first insulating layer 10. The gate GT may be a part of a metal pattern. The gate GT overlaps the active area AL. In a process of doping the semiconductor pattern, the gate GT may function as a mask.

A second insulating layer 20 is disposed on the first insulating layer 10 and may cover the gate GT. The second insulating layer 20 may overlap pixels in common. The second insulating layer 20 may be an inorganic layer and/or an organic layer, and may have a single layer structure or a multi-layer structure. The second insulating layer 20 may include at least one of silicon oxide, silicon nitride, and silicon oxynitride. In an embodiment, the second insulating layer 20 may have a multi-layer structure including a silicon oxide layer and a silicon nitride layer.

A third insulating layer 30 may be disposed on the second insulating layer 20. The third insulating layer 30 may have a single layer structure or a multi-layer structure. For example, the third insulating layer 30 may have a multi-layer structure including a silicon oxide layer and a silicon nitride layer.

A first connection electrode CNE1 may be disposed on the third insulating layer 30. The first connection electrode CNE1 may be connected to the connection signal wire SCL through a contact hole CNT-1 penetrating the first, second, and third insulating layers 10, 20, and 30.

A fourth insulating layer 40 may be disposed on the third insulating layer 30. The fourth insulating layer 40 may be a single silicon oxide layer. A fifth insulating layer 50 may be disposed on the fourth insulating layer 40. The fifth insulating layer 50 may be an organic layer.

A second connection electrode CNE2 may be disposed on the fifth insulating layer 50. The second connection electrode CNE2 may be connected to the first connection electrode CNE1 through a contact hole CNT-2 passing through the fourth insulating layer 40 and the fifth insulating layer 50.

A sixth insulating layer 60 may be disposed on the fifth insulating layer 50 and may cover the second connection electrode CNE2. The sixth insulating layer 60 may be an organic layer.

The light emitting element layer 130 may be disposed on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro-LED, or a nano-LED. Hereinafter, the description will be given under the condition that the light emitting element 100PE is an organic light emitting element, but an embodiment is not particularly limited thereto.

The light emitting element 100PE may include a first electrode AE, a light emitting layer EL, and a second electrode CE.

The first electrode AE may be disposed on the sixth insulating layer 60. The first electrode AE may be connected to the second connection electrode CNE2 through a contact hole CNT-3 penetrating the sixth insulating layer 60. This way, the first electrode AE may be electrically connected to the connection signal wire SCL.

A pixel defining layer 70 may be disposed on the sixth insulating layer 60 and may cover a portion of the first electrode AE. An opening 70-OP is provided in the pixel defining layer 70. The opening 70-OP of the pixel defining layer 70 exposes at least part of the first electrode AE.

The active area 1000A (see FIG. 1) may include an emission area PXA and a non-emission area NPXA adjacent to the emission area PXA. The non-emission area NPXA may surround the emission area PXA. In an embodiment, the emission area PXA corresponds to a partial area of the first electrode AE, which is exposed by the opening 70-OP.

The light emitting layer EL may be disposed on the first electrode AE. The light emitting layer EL may be disposed in an area corresponding to the opening 70-OP. In other words, the light emitting layer EL may be separately formed on each of a plurality of pixels. When the light emitting layers EL are separately formed on each of the pixels, each of the light emitting layers EL may emit light of at least one of a blue color, a red color, and a green color. However, an embodiment is not limited thereto. For example, the light emitting layer EL may be connected and provided to each of the pixels in common. In this case, the light emitting layer EL may provide blue light or white light.

The second electrode CE may be disposed on the light emitting layer EL. The second electrode CE may be integrally disposed in a plurality of pixels in common.

A hole control layer may be interposed between the first electrode AE and the light emitting layer EL. The hole control layer may be disposed in common in the emission area PXA and the non-emission area NPXA. The hole control layer may include a hole transport layer and may further include a hole injection layer. An electron control layer may be interposed between the light emitting layer EL and the second electrode CE. The electron control layer may include an electron transport layer, and may further include an electron injection layer. The hole control layer and the electron control layer may be formed in common in a plurality of pixels by using an open mask.

The encapsulation layer 140 may be disposed on the light emitting element layer 130. The encapsulation layer 140 may be in direct contact with the second electrode CE. The encapsulation layer 140 may include an inorganic layer, an organic layer, and an inorganic layer sequentially stacked, and layers constituting the encapsulation layer 140 are not limited thereto. The inorganic layers may protect the light emitting element layer 130 from moisture and oxygen, and the organic layer may protect the light emitting element layer 130 from a foreign material such as dust particles. The inorganic layers may include a silicon nitride layer, a silicon oxynitride layer, a silicon oxide layer, a titanium oxide layer, an aluminum oxide layer, or the like. The organic layer may include, but is not limited to, an acrylic-based organic layer.

The sensor layer 200 may include a base layer 201, a first conductive layer 202, a sensing insulating layer 203, a second conductive layer 204, and a cover insulating layer 205. The base layer 201, the first conductive layer 202, the sensing insulating layer 203, the second conductive layer 204, and the cover insulating layer 205 may be sequentially stacked.

The base layer 201 may be an inorganic layer including at least one of silicon nitride, silicon oxynitride, and silicon oxide. Alternatively, the base layer 201 may be an organic layer including an epoxy resin, an acrylate resin, or an imide-based resin. The base layer 201 may have a single-layer structure or may have a multi-layer structure stacked in the third direction DR3.

Each of the first conductive layer 202 and the second conductive layer 204 may have a single layer structure or may have a multi-layer structure stacked in the third direction DR3. The first conductive layer 202 and the second conductive layer 204 may be in direct contact with each other.

A conductive layer of a single layer structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), indium zinc tin oxide (IZTO), or the like. Additionally, the transparent conductive layer may include a conductive polymer such as PEDOT, a metal nano wire, graphene, and the like.

A conductive layer of the multi-layer structure may include metal layers. For example, the metal layers may have a three-layer structure of titanium/aluminum/titanium. The conductive layer of the multi-layer structure may include at least one metal layer and at least one transparent conductive layer.

At least one of the sensing insulating layer 203 and the cover insulating layer 205 may include an inorganic film. The inorganic film may include at least one of aluminum oxide, titanium oxide, silicon oxide, silicon nitride, silicon oxynitride, zirconium oxide, and hafnium oxide.

At least one of the sensing insulating layer 203 and the cover insulating layer 205 may include an organic film. The organic film may include at least one of acrylate-based resin, methacrylate-based resin, polyisoprene, vinyl-based resin, epoxy-based resin, urethane-based resin, cellulose-based resin, siloxane-based resin, polyimide-based resin, polyamide-based resin, and perylene-based resin.

Figure 5:
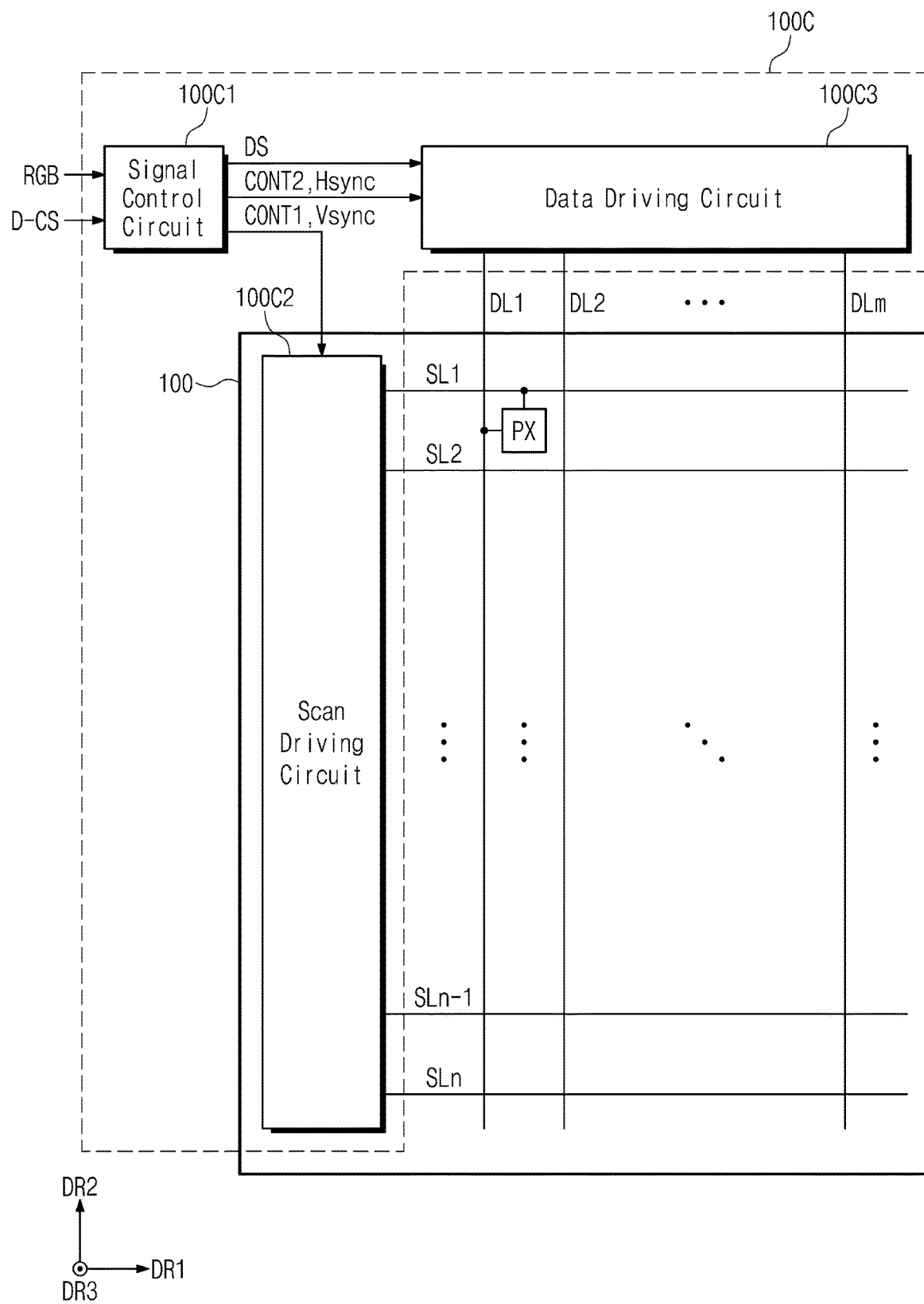
FIG. 5 is a block diagram of a display layer and a display driver, according to an embodiment of the present disclosure.

FIG. 5 is a block diagram of a display layer and a display driver, according to an embodiment of the present disclosure.

Referring to FIG. 5, the display layer 100 may include a plurality of scan wires SL1 to SLn (or gate lines), a plurality of data wires DL1 to DLm (or data lines), and a plurality of pixels PX. Each of the plurality of pixels PX is connected to a corresponding data wire among the plurality of data wires DL1 to DLm and is connected to a corresponding scan wire among the plurality of scan wires SL1 to SLn. In an embodiment of the present disclosure, the display layer 100 may further include light emitting control wires, and the display driver 100C may further include an emission driving circuit that provides control signals to light emitting control wires. The configuration of the display layer 100 is not particularly limited thereto.

Each of the plurality of scan wires SL1 to SLn may extend in the first direction DR1. The plurality of scan wires SL1 to SLn may be spaced from one another in the second direction DR2. The plurality of data wires DL1 to DLm may extend in the second direction DR2. The plurality of data wires DL1 to DLm may be spaced from one another in the first direction DR1.

The display driver 100C may include a signal control circuit 100C1, a scan driving circuit 100C2, and a data driving circuit 100C3.

The signal control circuit 100C1 may receive the image data RGB and the control signal D-CS from the main driver 1000C (see FIG. 2). The control signal D-CS may include various signals. For example, the control signal D-CS may include an input vertical synchronization signal, an input horizontal synchronization signal, a main clock, and a data enable signal.

On the basis of the control signal D-CS, the signal control circuit 100C1 may generate a first control signal CONT1 and a vertical synchronization signal Vsync, and may output the first control signal CONT1 and the vertical synchronization signal Vsync to the scan driving circuit 100C2.

On the basis of the control signal D-CS, the signal control circuit 100C1 may generate a second control signal CONT2 and a horizontal synchronization signal Hsync, and may output the second control signal CONT2 and the horizontal synchronization signal Hsync to the data driving circuit 100C3.

Furthermore, the signal control circuit 100C1 may output, to the data driving circuit 100C3, a driving signal DS obtained by processing the image data RGB under an operating condition of the display layer 100. The first control signal CONT1 and the second control signal CONT2 are signals used for operations of the scan driving circuit 100C2 and the data driving circuit 100C3 and are not particularly limited thereto.

The scan driving circuit 100C2 drives the plurality of scan wires SL1 to SLn in response to the first control signal CONT1 and the vertical synchronization signal Vsync. In an embodiment of the present disclosure, the scan driving circuit 100C2 may be formed in the same process as the circuit layer 120 (see FIG. 4) in the display layer 100, but is not limited thereto. For example, the scan driving circuit 100C2 may be implemented as an integrated circuit (IC). The scan driving circuit 100C2 may be directly mounted in a predetermined area of the display layer 100 or may be mounted on a separate printed circuit board in a chip on film (COF) scheme, and then may be electrically connected to the display layer 100.

The data driving circuit 100C3 may output grayscale voltages to the plurality of data wires DL1 to DLm in response to the second control signal CONT2, the vertical synchronization signal Hsync, and the driving signal DS that are received from the signal control circuit 100C1. The data driving circuit 100C3 may be implemented with an IC. The data driving circuit 100C3 may be directly mounted in a predetermined area of the display layer 100 or may be mounted on a separate printed circuit board in a COF scheme, and then may be electrically connected to the display layer 100, but is not particularly limited thereto. For example, the data driving circuit 100C3 may be formed in the same process as the circuit layer 120 (see FIG. 4) in the display layer 100.

Figure 6A:
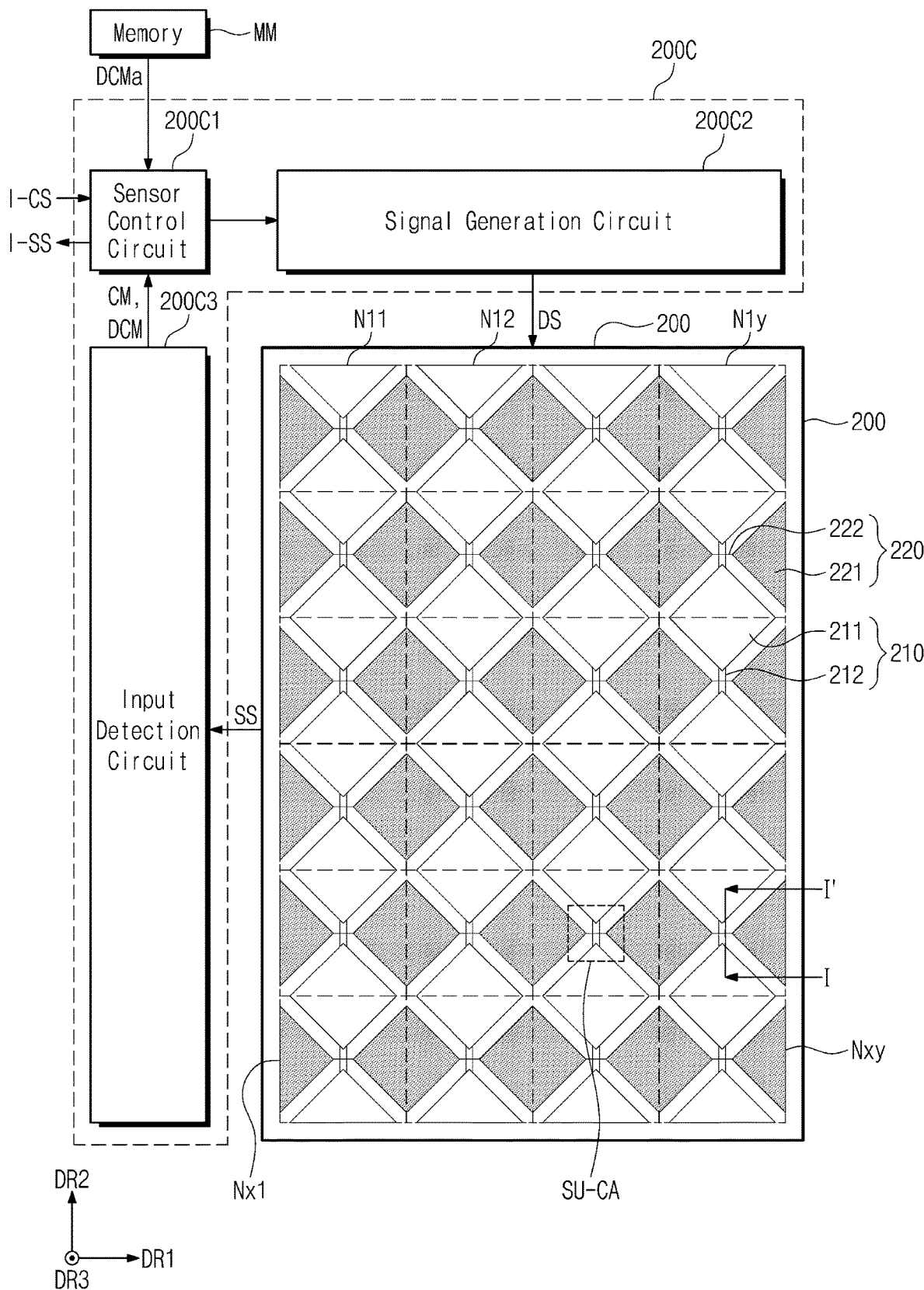
FIG. 6A is a block diagram of a sensor layer and a sensor driver, according to an embodiment of the present disclosure.

FIG. 6A is a block diagram of a sensor layer and a sensor driver, according to an embodiment of the present disclosure.

Referring to FIG. 6A, the sensor layer 200 may include a plurality of electrodes 210 and a plurality of cross electrodes 220. The plurality of electrodes 210 may be arranged in the first direction DR1, and each of the plurality of electrodes 210 may extend in the second direction DR2. The plurality of cross electrodes 220 may be arranged in the second direction DR2, and each of the plurality of cross electrodes 220 may extend in the first direction DR1. The plurality of electrodes 210 may intersect the plurality of cross electrodes 220. The sensor layer 200 may further include a plurality of signal wires connected to the plurality of electrodes 210 and the plurality of cross electrodes 220.

Each of the plurality of electrodes 210 may include a sensing pattern 211 and a bridge pattern 212. The two sensing patterns 211 adjacent to each other may be electrically connected to each other by two bridge patterns 212, but are not particularly limited thereto. The sensing pattern 211 may be included in the second conductive layer 204 (see FIG. 4), and the bridge pattern 212 may be included in the first conductive layer 202 (see FIG. 4).

Each of the plurality of cross electrodes 220 may include a first portion 221 and a second portion 222. The first portion 221 and the second portion 222 may have integral shapes with each other and may be disposed on the same layer. For example, the first portion 221 and the second portion 222 may be included in the second conductive layer 204 (see FIG. 4). The two bridge patterns 212 may be intersected with the second portion 222 in an insulation scheme.

The sensor driver 200C may receive the control signal I-CS from the main driver 1000C (see FIG. 2) and may provide the coordinate signal I-SS to the main driver 1000C (see FIG. 2).

The sensor driver 200C may be implemented as IC. The sensor driver 200C having an IC type may be directly mounted in a predetermined area of the sensor layer 200 or may be mounted on a separate printed circuit board in a COF scheme, and then may be electrically connected to the sensor layer 200.

The sensor driver 200C may include a sensor control circuit 200C1, a signal generation circuit 200C2, and an input detection circuit 200C3. The sensor control circuit 200C1 may control operations of the signal generation circuit 200C2 and the input detection circuit 200C3 based on the control signal I-CS. The sensor control circuit 200C1 may receive a plurality of first differential sensitivity values DCMa from an external memory MM.

The plurality of first differential sensitivity values DCMa may be calculated from a difference between two adjacent first sensitivity values among a plurality of first sensitivity values. The plurality of first differential sensitivity values DCMa may be calculated from a plurality of first sensitivity values measured in a first environment. The first environment may be an environment having a first temperature. For example, the first temperature may be a room temperature.

The plurality of first sensitivity values may be calculated from a plurality of nodes N11 to Nxy provided in areas where the plurality of electrodes 210 intersect the plurality of cross electrodes 220, respectively. The plurality of first sensitivity values may correspond to the nodes N11 to Nxy, respectively. For example, one sensitivity value may be derived by one sensing signal corresponding to one node. 'x' is a positive integer, and 'y' is a positive integer.

Each of the nodes N11 to Nxy may be provided in an area where the one electrode 210 among the plurality of electrodes 210 intersects the one cross electrode 220 among the plurality of cross electrodes 220. FIG. 6A illustrates that four nodes N11 and N12 to N1$y$ are arranged in the first direction DR1, and six nodes N11 to Nx1 are arranged in the second direction DR2. However, the number of nodes N11 to Nxy is not limited thereto. For example, the number of nodes N11 to Nxy may be greater or less than that shown in FIG. 6A.

For example, when the electronic device 1000 (see FIG. 1) is manufactured, the plurality of first sensitivity values may be calculated based on a sensing signal SS measured by the sensor layer 200 where the separate external input 2000 is not provided. The plurality of first differential sensitivity values DCMa may be calculated based on the plurality of first differential sensitivity values. The plurality of first differential sensitivity values DCMa may be stored in the memory MM.

The signal generation circuit 200C2 may sequentially output the driving signal DS to the sensor layer 200 (e.g., the cross electrodes 220). The input detection circuit 200C3 may receive the sensing signals SS from the sensor layer 200. For example, the input detection circuit 200C3 may receive the sensing signals SS from the electrodes 210. In an embodiment of the present disclosure, the signal generation circuit 200C2 may sequentially output the driving signal DS to the electrodes 210, and the input detection circuit 200C3 may receive the sensing signals SS from the cross electrodes 220.

The input detection circuit 200C3 may convert the sensing signals SS into second sensitivity values CM, respectively. For example, the sensing signals SS may be an analog capacitance signal generated by a touch. The input detection circuit 200C3 may include an analog-to-digital converter that converts the analog capacitance signal into the second sensitivity values CM in a digital form.

The sensing signals SS and the second sensitivity values CM respectively corresponding thereto may correspond to the nodes N11 to Nxy, respectively. For example, one sensitivity value may be derived by one sensing signal corresponding to one node.

The input detection circuit 200C3 may calculate a plurality of second differential sensitivity values DCM from a difference between adjacent second sensitivity values among the plurality of second sensitivity values CM. The plurality of second differential sensitivity values DCM may be calculated from the plurality of second sensitivity values CM measured in a second environment. The second environment may be an environment having a second temperature. The second temperature may be a lower temperature than the first temperature. For example, the second temperature may be a relatively low temperature.

A parasitic capacitor may be formed between the sensor layer 200 and the second electrode CE (see FIG. 4). The parasitic capacitor may also be referred to as "base capacitance". As a distance between the sensor layer 200 (see FIG. 4) and the second electrode CE decreases, the capacitance of the parasitic capacitor may increase. As the capacitance of the parasitic capacitor increases, a ratio of an amount of change in capacitance to a reference value may decrease. The amount of change in capacitance refers to a change in capacitance that occurs between before and after an input by the input means (e.g., the external input 2000 (see FIG. 2)).

The sensor control circuit 200C1 may perform a leveling operation of removing a value corresponding to the capacitance of the parasitic capacitor from the sensed signal. The leveling operation may refer to an operation of updating a baseline. It is possible to determine whether to update the baseline by using the plurality of first differential sensitivity values DCMa and the plurality of second differential sensitivity values DCM. In other words, one can determine whether to update the baseline using both the plurality of first differential sensitivity values DCMa and the plurality of second differential sensitivity values DCM. This will be described later.

According to an embodiment of the present disclosure, the ratio of an amount of change in capacitance to a reference value may be improved by updating the baseline. Accordingly, the electronic device 1000 (see FIG. 1) having improved sensing reliability may be provided.

Figure 6B:
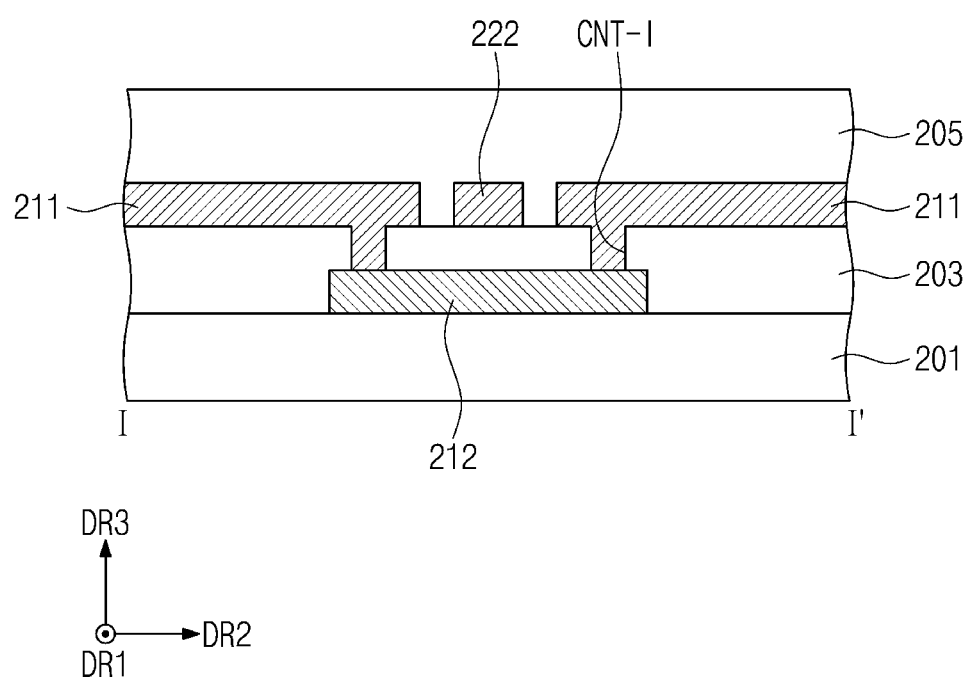
FIG. 6B is a cross-sectional view of a sensor layer taken along line I-I' of FIG. 6A, according to an embodiment of the present disclosure.

FIG. 6B is a cross-sectional view of a sensor layer taken along line I-I' of FIG. 6A, according to an embodiment of the present disclosure.

Referring to FIGS. 6A and 6B, the sensor layer 200 may have a bottom bridge structure. For example, the bridge pattern 212 may be included in the first conductive layer 202 (see FIG. 4). The first portion 221, the second portion 222, and the sensing pattern 211 may be included in the second conductive layer 204 (see FIG. 4). The sensing pattern 211 may be connected to the bridge pattern 212 through the contact hole CNT-I penetrating the sensing insulating layer 203.

Figure 6C:
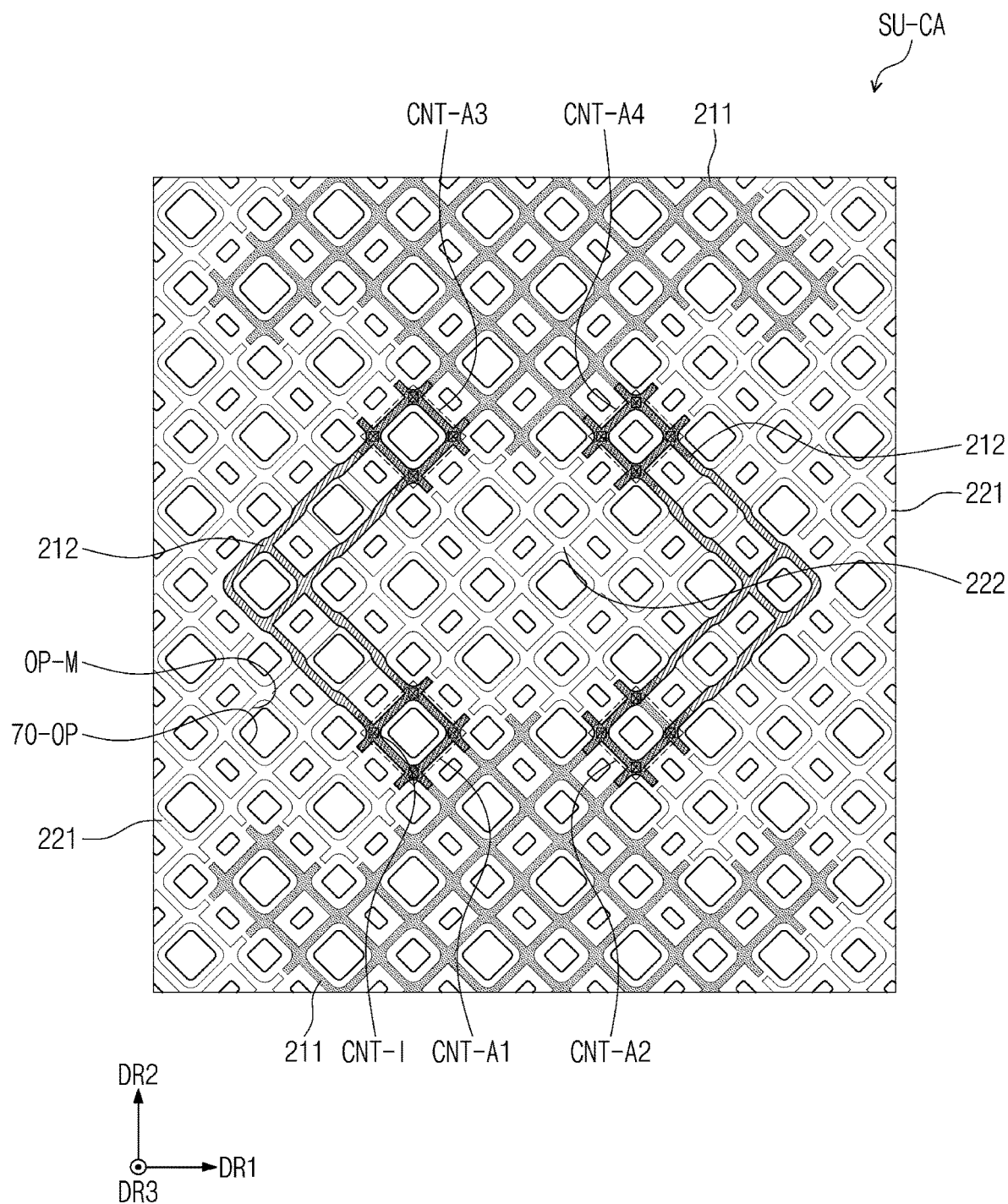
FIG. 6C is an enlarged plan view of an area of FIG. 6A, according to an embodiment of the present disclosure.

FIG. 6C is an enlarged plan view of one area of FIG. 6A, according to an embodiment of the present disclosure.

Referring to FIGS. 6A and 6C, a cross area SU-CA may be an area where the bridge patterns 212 are arranged.

The sensing pattern 211 may have a mesh structure. An opening OP-M may be provided in the sensing pattern 211. The one opening OP-M may overlap the opening 70-OP provided in the pixel defining layer PDL However, this is only an example. For example, the one opening OP-M may overlap the plurality of openings 70-OP. Each of the bridge pattern 212, the first portion 221, and the second portion 222 may have a mesh structure similar to that of the sensing pattern 211.

The two bridge patterns 212 may connect the two sensing patterns 211. First to fourth connection areas CNT-A1, CNT-A2, CNT-A3 and CNT-A4 are provided between the two bridge patterns 212 and the two sensing patterns 211. The four contact holes CNT-I may be formed in the first to fourth connection areas CNT-A1 to CNT-A4, respectively. However, this is only an example. For example, the two sensing patterns 211 may be electrically connected by one bridge pattern. In another embodiment, the two sensing patterns 211 may be electrically connected by three or more bridge patterns.

Figure 7:
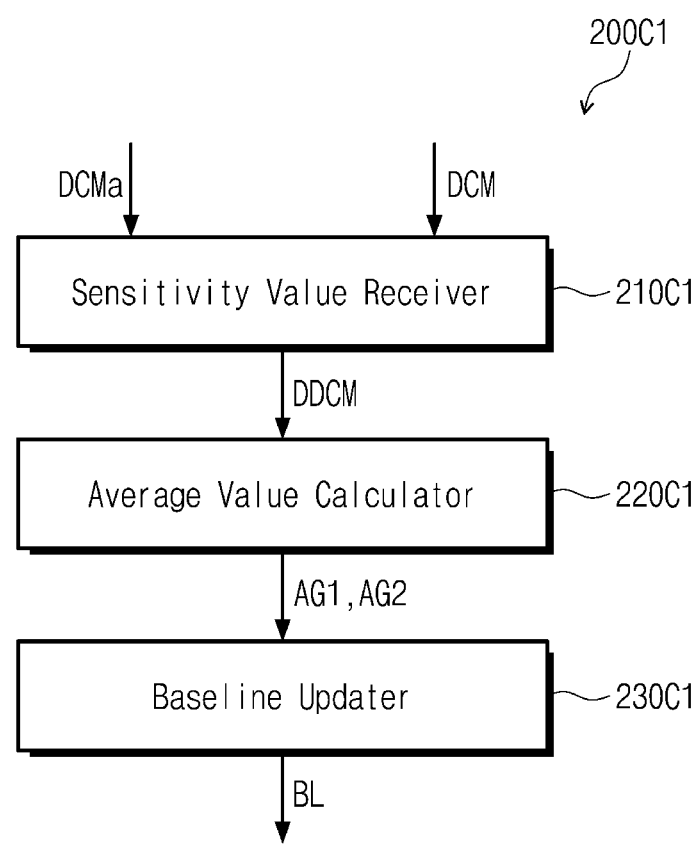
FIG. 7 is a block diagram illustrating a sensor control circuit, according to an embodiment of the present disclosure.
Figure 8:
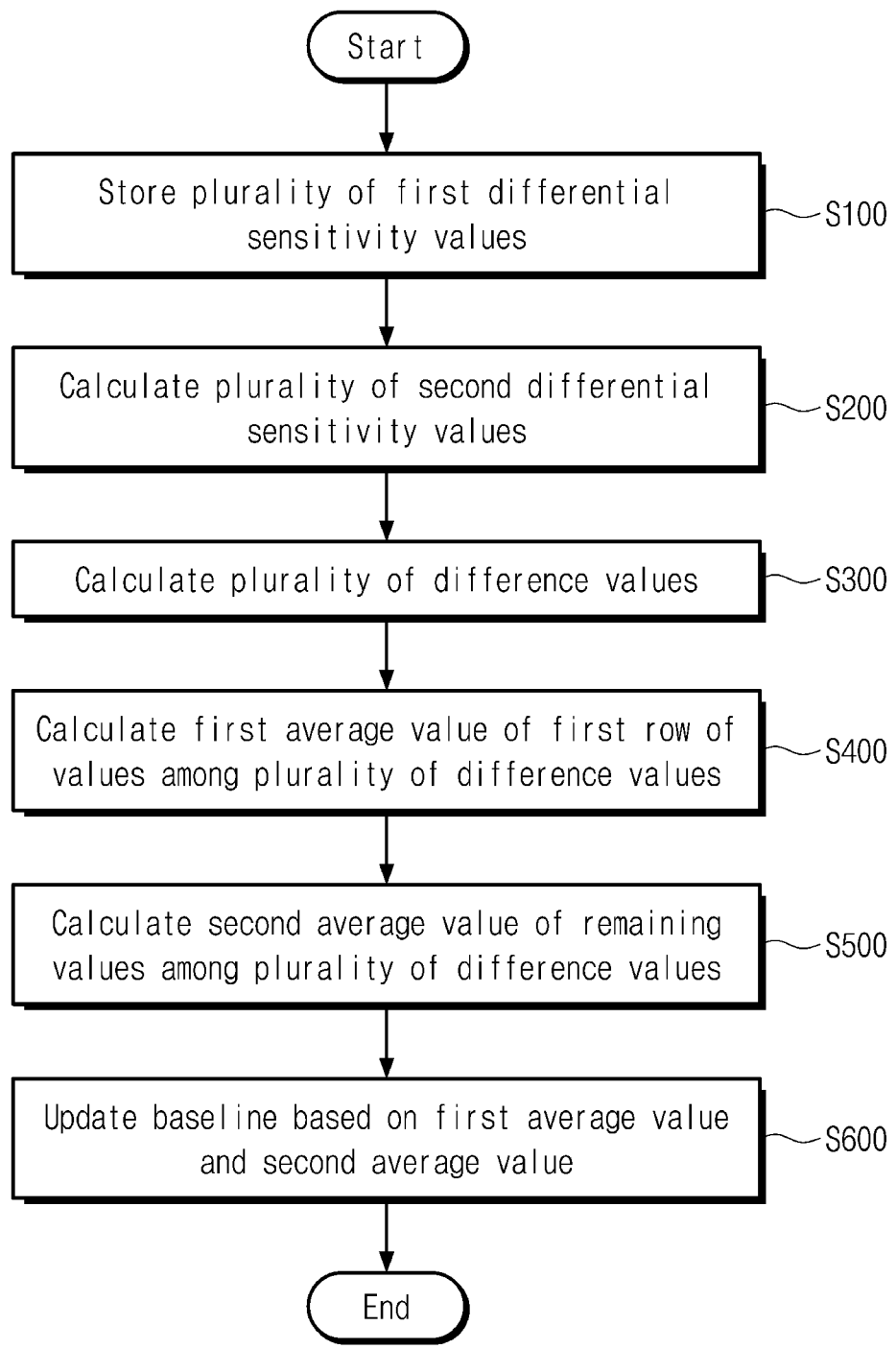
FIG. 8 is a flowchart illustrating a method of driving an electronic device, according to an embodiment of the present disclosure.

FIG. 7 is a block diagram illustrating a sensor control circuit, according to an embodiment of the present disclosure. FIG. 8 is a flowchart illustrating a method of driving an electronic device, according to an embodiment of the present disclosure.

Referring to FIGS. 6A to 8, the sensor control circuit 200C1 may include a sensitivity value receiver 210C1, an average value calculator 220C1, and a baseline updater 230C1.

The sensor layer 200 may measure the sensing signals SS in a first environment. In this case, a plurality of first sensitivity values for each node may be calculated based on the sensing signals SS. The first environment may refer to a state where the separate external input 2000 (see FIG. 2) is not provided at a first temperature that is a room temperature. In other words, the first environment is a condition where no separate external input 2000 (see FIG. 2) is given at room temperature. For example, the first environment may refer to a state immediately after the electronic device 1000 (see FIG. 1) is released from manufacture.

TABLE 1

|  | Y0 | Y1 | Y2 | Y3 | Y4 | Y5 | Y6 |
|---|---|---|---|---|---|---|---|
| X0 | 655 | 659 | 657 | 660 | 659 | 653 | 645 |
| X1 | 682 | 686 | 684 | 685 | 687 | 679 | 671 |
| X2 | 685 | 690 | 687 | 689 | 690 | 683 | 674 |
| X3 | 690 | 695 | 693 | 694 | 696 | 688 | 679 |
| X4 | 692 | 698 | 696 | 697 | 698 | 691 | 682 |
| X5 | 698 | 704 | 701 | 703 | 703 | 696 | 687 |
| X6 | 702 | 708 | 705 | 708 | 708 | 700 | 691 |
| X7 | 707 | 714 | 712 | 713 | 715 | 706 | 697 |
| X8 | 710 | 716 | 716 | 717 | 716 | 709 | 699 |
| X9 | 713 | 720 | 719 | 720 | 721 | 712 | 703 |
| X10 | 717 | 724 | 724 | 725 | 726 | 717 | 706 |
| X11 | 723 | 730 | 731 | 732 | 732 | 724 | 712 |
| X12 | 724 | 731 | 731 | 733 | 733 | 724 | 713 |
| X13 | 726 | 734 | 734 | 737 | 736 | 728 | 716 |
| X14 | 731 | 739 | 740 | 742 | 743 | 734 | 722 |
| X15 | 732 | 741 | 742 | 745 | 747 | 737 | 725 |
| X16 | 736 | 744 | 746 | 748 | 748 | 740 | 728 |
| X17 | 740 | 748 | 749 | 752 | 752 | 744 | 730 |
| X18 | 743 | 751 | 752 | 754 | 755 | 746 | 733 |
| X19 | 745 | 755 | 756 | 758 | 759 | 750 | 736 |
| X20 | 749 | 758 | 775 | 762 | 763 | 753 | 740 |
| X21 | 757 | 767 | 769 | 772 | 773 | 762 | 749 |
| X22 | 758 | 767 | 770 | 773 | 774 | 764 | 749 |
| X23 | 757 | 768 | 769 | 773 | 775 | 764 | 750 |
| X24 | 758 | 769 | 770 | 773 | 775 | 765 | 750 |
| X25 | 758 | 770 | 771 | 774 | 776 | 765 | 751 |
| X26 | 759 | 770 | 772 | 775 | 776 | 766 | 751 |
| X27 | 762 | 773 | 775 | 778 | 779 | 769 | 754 |
| X28 | 762 | 774 | 775 | 779 | 780 | 770 | 755 |
| X29 | 760 | 772 | 774 | 777 | 779 | 768 | 753 |
| X30 | 758 | 770 | 772 | 775 | 777 | 766 | 752 |
| X31 | 757 | 768 | 771 | 774 | 775 | 764 | 750 |
| X32 | 759 | 770 | 773 | 775 | 778 | 766 | 750 |
| X33 | 745 | 755 | 758 | 760 | 763 | 752 | 737 |

Table 1 may indicate a plurality of first sensitivity values, which are obtained by converting the sensing signals SS measured in the sensor layer 200 by the sensor driver 200C in the first environment. Table 1 shows 34 nodes X0 to X33 arranged in the first direction DR1 in columns, and seven nodes Y0 to Y6 arranged in the second direction DR2 in rows. However, this is an example. For example, the number of nodes provided in the sensor layer 200 according to an embodiment of the present disclosure is not limited thereto. Furthermore, the data shown in Table 1 is illustrative, and rows and columns of Table 1 may be interchanged with each other.

The 34 nodes X0 to X33 may correspond to the number of electrodes 210 arranged in the first direction DR1. The seven nodes Y0 to Y6 may correspond to the number of cross electrodes 220 arranged in the opposite direction of the second direction DR2.

The input detection circuit 200C3 may calculate the plurality of first differential sensitivity values DCMa obtained by calculating a difference between first sensitivity values at other nodes adjacent to each other in a direction opposite to the first direction DR1 of each of a plurality of first sensitivity values.

TABLE 2

|  | Y0 | Y1 | Y2 | Y3 | Y4 | Y5 | Y6 |
|---|---|---|---|---|---|---|---|
| A0 | 655 | 659 | 657 | 660 | 659 | 653 | 645 |
| A1 | 27 | 27 | 27 | 25 | 28 | 26 | 26 |
| A2 | 3 | 4 | 3 | 4 | 3 | 4 | 3 |
| A3 | 5 | 5 | 6 | 5 | 6 | 5 | 5 |
| A4 | 2 | 3 | 3 | 3 | 2 | 3 | 3 |
| A5 | 6 | 6 | 5 | 6 | 5 | 5 | 5 |
| A6 | 4 | 4 | 4 | 5 | 5 | 4 | 4 |
| A7 | 5 | 6 | 7 | 5 | 7 | 6 | 6 |
| A8 | 3 | 2 | 4 | 4 | 2 | 3 | 2 |
| A9 | 3 | 4 | 3 | 3 | 4 | 3 | 4 |
| A10 | 4 | 4 | 5 | 5 | 5 | 5 | 3 |
| A11 | 6 | 6 | 7 | 7 | 6 | 7 | 6 |
| A12 | 1 | 1 | 0 | 1 | 1 | 0 | 1 |
| A13 | 2 | 3 | 3 | 4 | 3 | 4 | 3 |
| A14 | 5 | 5 | 6 | 5 | 7 | 6 | 6 |
| A15 | 1 | 2 | 2 | 3 | 4 | 3 | 3 |
| A16 | 4 | 3 | 4 | 3 | 1 | 3 | 3 |
| A17 | 4 | 4 | 3 | 4 | 4 | 4 | 2 |
| A18 | 3 | 3 | 3 | 2 | 3 | 2 | 3 |
| A19 | 2 | 4 | 4 | 4 | 4 | 4 | 3 |
| A20 | 4 | 3 | 19 | 4 | 4 | 3 | 4 |
| A21 | 8 | 9 | −6 | 10 | 10 | 9 | 9 |
| A22 | 1 | 0 | 1 | 1 | 1 | 2 | 0 |
| A23 | −1 | 1 | −1 | 0 | 1 | 0 | 1 |
| A24 | 1 | 1 | 1 | 0 | 0 | 1 | 0 |
| A25 | 0 | 1 | 1 | 1 | 1 | 0 | 1 |
| A26 | 1 | 0 | 1 | 1 | 0 | 1 | 0 |
| A27 | 3 | 3 | 3 | 3 | 3 | 3 | 3 |
| A28 | 0 | 1 | 0 | 1 | 1 | 1 | 1 |
| A29 | −2 | −2 | −1 | −2 | −1 | −2 | −2 |
| A30 | −2 | −2 | −2 | −2 | −2 | −2 | −1 |
| A31 | −1 | −2 | −1 | −1 | −2 | −2 | −2 |
| A32 | 2 | 2 | 2 | 1 | 3 | 2 | 0 |
| A33 | −14 | −15 | −15 | −15 | −15 | −14 | −13 |

Table 2 may be the plurality of first differential sensitivity values DCMa calculated based on the first sensitivity values of Table 1. Table 2 shows a difference with the first sensitivity values at other adjacent nodes (e.g., A0 corresponding to X0, A1 corresponding to "X1-X0", or A2 corresponding to "X2-X1") with respect to the 34 nodes X0 to X33 in Table 1. For example, the difference with the first sensitivity values at the adjacent node A0 may be 655, the difference with the first sensitivity values at the adjacent node A1 may be 27, and the difference with the first sensitivity values at the adjacent node A2 may be 3.

The plurality of first differential sensitivity values DCMa may be stored in the memory MM (S100). For example, the plurality of first differential sensitivity values DCMa may be stored in the memory MM in the form of a table.

The sensor layer 200 may measure the sensing signals SS in a second environment different from the first environment. In this case, the plurality of second sensitivity values CM for each node may be calculated based on the sensing signals SS. The second environment may refer to the current environment of the electronic device 1000.

TABLE 3

|  | Y0 | Y1 | Y2 | Y3 | Y4 | Y5 | Y6 |
|---|---|---|---|---|---|---|---|
| X0 | 606 | 614 | 612 | 613 | 613 | 606 | 599 |
| X1 | 631 | 637 | 635 | 636 | 638 | 630 | 623 |
| X2 | 633 | 639 | 637 | 639 | 641 | 634 | 626 |
| X3 | 636 | 643 | 642 | 643 | 646 | 638 | 631 |
| X4 | 638 | 646 | 646 | 647 | 650 | 642 | 635 |
| X5 | 642 | 650 | 650 | 651 | 653 | 646 | 637 |
| X6 | 645 | 653 | 652 | 653 | 655 | 647 | 639 |
| X7 | 648 | 656 | 656 | 657 | 659 | 650 | 642 |
| X8 | 650 | 658 | 659 | 660 | 661 | 653 | 644 |
| X9 | 652 | 660 | 661 | 662 | 663 | 654 | 645 |
| X10 | 655 | 664 | 665 | 665 | 666 | 658 | 647 |
| X11 | 659 | 669 | 670 | 671 | 672 | 663 | 652 |
| X12 | 661 | 670 | 672 | 673 | 674 | 666 | 654 |
| X13 | 662 | 672 | 674 | 676 | 676 | 668 | 655 |
| X14 | 665 | 676 | 677 | 679 | 681 | 672 | 659 |
| X15 | 667 | 679 | 680 | 682 | 683 | 674 | 662 |
| X16 | 670 | 681 | 683 | 684 | 686 | 677 | 664 |
| X17 | 674 | 684 | 686 | 688 | 689 | 680 | 668 |
| X18 | 677 | 687 | 689 | 690 | 692 | 683 | 669 |
| X19 | 679 | 690 | 693 | 694 | 696 | 685 | 672 |
| X20 | 681 | 693 | 709 | 697 | 698 | 688 | 674 |
| X21 | 691 | 705 | 707 | 710 | 712 | 701 | 686 |
| X22 | 692 | 705 | 708 | 710 | 712 | 701 | 687 |
| X23 | 693 | 706 | 709 | 711 | 713 | 703 | 689 |
| X24 | 693 | 707 | 710 | 713 | 715 | 703 | 689 |
| X25 | 693 | 708 | 710 | 713 | 715 | 704 | 690 |
| X26 | 694 | 709 | 712 | 714 | 715 | 705 | 691 |
| X27 | 698 | 711 | 714 | 716 | 718 | 707 | 692 |
| X28 | 698 | 711 | 715 | 717 | 719 | 710 | 692 |
| X29 | 696 | 711 | 713 | 716 | 719 | 708 | 692 |
| X30 | 694 | 709 | 713 | 715 | 718 | 706 | 691 |
| X31 | 693 | 708 | 711 | 713 | 716 | 705 | 690 |
| X32 | 695 | 709 | 713 | 716 | 717 | 707 | 690 |
| X33 | 684 | 697 | 701 | 703 | 706 | 695 | 678 |

Table 3 may indicate the plurality of second sensitivity values CM obtained by converting the sensing signals SS measured in the sensor layer 200 by the sensor driver 200C in a second environment. The second environment may have a second temperature lower than the first temperature. The capacitance sensed by the sensor layer 200 may be affected by an external environment. For example, when the temperature is lowered, the dielectric constant of a medium may be lowered, and thus a value of the capacitance may be reduced. Accordingly, the plurality of second sensitivity values CM measured in the second environment may be smaller than a plurality of first sensitivity values measured in the first environment, respectively.

The input detection circuit 200C3 may calculate the plurality of second differential sensitivity values DCM obtained by calculating a difference between second sensitivity values at other nodes adjacent to each other in a direction opposite to the first direction DR1 of each of the plurality of second sensitivity values CM.

TABLE 4

|  | Y0 | Y1 | Y2 | Y3 | Y4 | Y5 | Y6 |
|---|---|---|---|---|---|---|---|
| A0 | 606 | 614 | 612 | 613 | 613 | 606 | 599 |
| A1 | 25 | 23 | 23 | 23 | 25 | 24 | 24 |
| A2 | 2 | 2 | 2 | 3 | 3 | 4 | 3 |
| A3 | 3 | 4 | 5 | 4 | 5 | 4 | 5 |
| A4 | 2 | 3 | 4 | 4 | 4 | 4 | 4 |
| A5 | 4 | 4 | 4 | 4 | 3 | 4 | 2 |
| A6 | 3 | 3 | 2 | 2 | 2 | 1 | 2 |
| A7 | 3 | 3 | 4 | 4 | 4 | 3 | 3 |
| A8 | 2 | 2 | 3 | 3 | 2 | 3 | 2 |
| A9 | 2 | 2 | 2 | 2 | 2 | 1 | 1 |
| A10 | 3 | 4 | 4 | 3 | 3 | 4 | 2 |
| A11 | 4 | 5 | 5 | 6 | 6 | 5 | 5 |
| A12 | 2 | 1 | 2 | 2 | 2 | 3 | 2 |
| A13 | 1 | 2 | 2 | 3 | 2 | 2 | 1 |
| A14 | 3 | 4 | 3 | 3 | 5 | 4 | 4 |
| A15 | 2 | 3 | 3 | 3 | 2 | 2 | 3 |
| A16 | 3 | 2 | 3 | 2 | 3 | 3 | 2 |
| A17 | 4 | 3 | 3 | 4 | 3 | 3 | 4 |
| A18 | 3 | 3 | 3 | 2 | 3 | 3 | 1 |
| A19 | 2 | 3 | 4 | 4 | 4 | 2 | 3 |
| A20 | 2 | 3 | 16 | 3 | 2 | 3 | 2 |
| A21 | 10 | 12 | −2 | 13 | 14 | 13 | 12 |
| A22 | 1 | 0 | 1 | 0 | 0 | 0 | 1 |

TABLE 4-continued

|     | Y0  | Y1  | Y2  | Y3  | Y4  | Y5  | Y6  |
|-----|-----|-----|-----|-----|-----|-----|-----|
| A23 | 1   | 1   | 1   | 1   | 1   | 2   | 2   |
| A24 | 0   | 1   | 1   | 2   | 2   | 0   | 0   |
| A25 | 0   | 1   | 0   | 0   | 0   | 1   | 1   |
| A26 | 1   | 1   | 2   | 1   | 0   | 1   | 1   |
| A27 | 3   | 2   | 2   | 2   | 3   | 2   | 1   |
| A28 | 0   | 0   | 1   | 1   | 1   | 3   | 0   |
| A29 | −1  | 0   | −2  | −1  | 0   | −2  | 0   |
| A30 | −2  | −2  | 0   | −1  | −1  | −2  | −1  |
| A31 | −1  | −1  | −2  | −2  | −2  | −1  | −1  |
| A32 | 2   | 1   | 2   | 3   | 0   | 2   | 0   |
| A33 | −11 | −12 | −12 | −13 | −11 | −12 | −12 |

Table 4 may indicate the plurality of second differential sensitivity values DCM calculated based on the second sensitivity values CM of Table 3. Table 4 shows a difference with the second sensitivity values CM at other adjacent nodes (e.g., A0 corresponding to X0, A1 corresponding to "X1-X0", or A2 corresponding to "X2-X1") with respect to the 34 nodes X0 to X33 in Table 3. For example, the difference with the second sensitivity values at the adjacent node A0 may be 606, the difference with the second sensitivity values at the adjacent node A1 may be 25, and the difference with the second sensitivity values at the adjacent node A2 may be 2.

The input detection circuit 200C3 may calculate the plurality of second differential sensitivity values DCM (S200).

The sensitivity value receiver 210C1 may receive the plurality of first differential sensitivity values DCMa from the memory MM and the plurality of second differential sensitivity values DCM from the input detection circuit 200C3.

The sensitivity value receiver 210C1 may calculate a plurality of difference values DDCM between the plurality of first differential sensitivity values DCMa and the plurality of second differential sensitivity values DCM (S300). The sensitivity value receiver 210C1 may output the plurality of difference values DDCM to the average value calculator 220C1.

TABLE 5

|     | Y0  | Y1  | Y2  | Y3  | Y4  | Y5  | Y6  |
|-----|-----|-----|-----|-----|-----|-----|-----|
| B0  | −49 | −45 | −45 | −47 | −46 | −47 | −46 |
| B1  | −2  | −4  | −4  | −2  | −3  | −2  | −2  |
| B2  | −1  | −2  | −1  | −1  | 0   | 0   | 0   |
| B3  | −2  | −1  | −1  | −1  | −1  | −1  | 0   |
| B4  | 0   | 0   | 1   | 1   | 2   | 1   | 1   |
| B5  | −2  | −2  | −1  | −2  | −2  | −1  | −3  |
| B6  | −1  | −1  | −2  | −3  | −3  | −3  | −2  |
| B7  | −2  | −3  | −3  | −1  | −3  | −3  | −3  |
| B8  | −1  | 0   | −1  | −1  | 0   | 0   | 0   |
| B9  | −1  | −2  | −1  | −1  | −2  | −2  | −3  |
| B10 | −1  | 0   | −1  | −2  | −2  | −1  | −1  |
| B11 | −2  | −1  | −2  | −1  | 0   | −2  | −1  |
| B12 | 1   | 0   | 2   | 1   | 1   | 3   | 1   |
| B13 | −1  | −1  | −1  | −1  | −1  | −2  | −2  |
| B14 | −2  | −1  | −3  | −2  | −2  | −2  | −2  |
| B15 | 1   | 1   | 1   | 0   | −2  | −1  | 0   |
| B16 | −1  | −1  | −1  | −1  | 2   | 0   | −1  |
| B17 | 0   | −1  | 0   | 0   | −1  | −1  | 2   |
| B18 | 0   | 0   | 0   | 0   | 0   | 1   | −2  |
| B19 | 0   | −1  | 0   | 0   | 0   | −2  | 0   |
| B20 | −2  | 0   | −3  | −1  | −2  | 0   | −2  |
| B21 | 2   | 3   | 4   | 3   | 4   | 4   | 3   |
| B22 | 0   | 0   | 0   | −1  | −1  | −2  | 1   |
| B23 | 2   | 0   | 2   | 1   | 0   | 2   | 1   |
| B24 | −1  | 0   | 0   | 2   | 2   | −1  | 0   |
| B25 | 0   | 0   | −1  | −1  | −1  | 1   | 0   |
| B26 | 0   | 1   | 1   | 0   | 0   | 0   | 1   |
| B27 | 0   | −1  | −1  | −1  | 0   | −1  | −2  |
| B28 | 0   | −1  | 1   | 0   | 0   | 2   | −1  |
| B29 | 1   | 2   | −1  | 1   | 1   | 0   | 2   |
| B30 | 0   | 0   | 2   | 1   | 1   | 0   | 0   |
| B31 | 0   | 1   | −1  | −1  | 0   | 1   | 1   |
| B32 | 0   | −1  | 0   | 2   | −2  | 0   | 0   |
| B33 | 3   | 3   | 3   | 2   | 4   | 2   | 1   |

Table 5 may indicate the plurality of difference values DDCM calculated by the sensitivity value receiver 210C1. The average value calculator 220C1 may calculate a first average value AG1 of a first row or column of values among the plurality of difference values DDCM (S400). The average value calculator 220C1 may calculate the first average value AG1 based on the difference values DDCM measured from the sensing signals SS measured at nodes where the first driving signal DS is provided. For example, the average value calculator 220C1 may calculate the first average value AG1 by using the difference values DDCM calculated from the sensing signals SS measured at the leftmost nodes N1 to Nx1 in FIG. 6A. For example, the average value calculator 220C1 may calculate an average value of difference values of row B0 as the first average value AG1. In this case, the first average value AG1 may be −46.4. In other words, the first average value AG1, i.e., −46.4, of row B0 is the average of the following values (−49, −45, −45, −47, −46, −47, −46).

The average value calculator 220C1 may calculate a second average value AG2 of the remaining values among the plurality of difference values DDCM (S500). For example, the average value calculator 220C1 may calculate an average value of difference values of rows B1 to B33 as the second average value AG2. In this case, the second average value AG2 may be −0.35.

The average value calculator 220C1 may output the first average value AG1 and the second average value AG2 to the baseline updater 230C1.

The baseline updater 230C1 may determine whether to update a baseline, based on the first average value AG1 and the second average value AG2. For example, when each of the first average value AG1 and the second average value AG2 satisfies a specific condition, the baseline updater 230C1 may update the baseline (S600). This will be described later.

Figure 9:
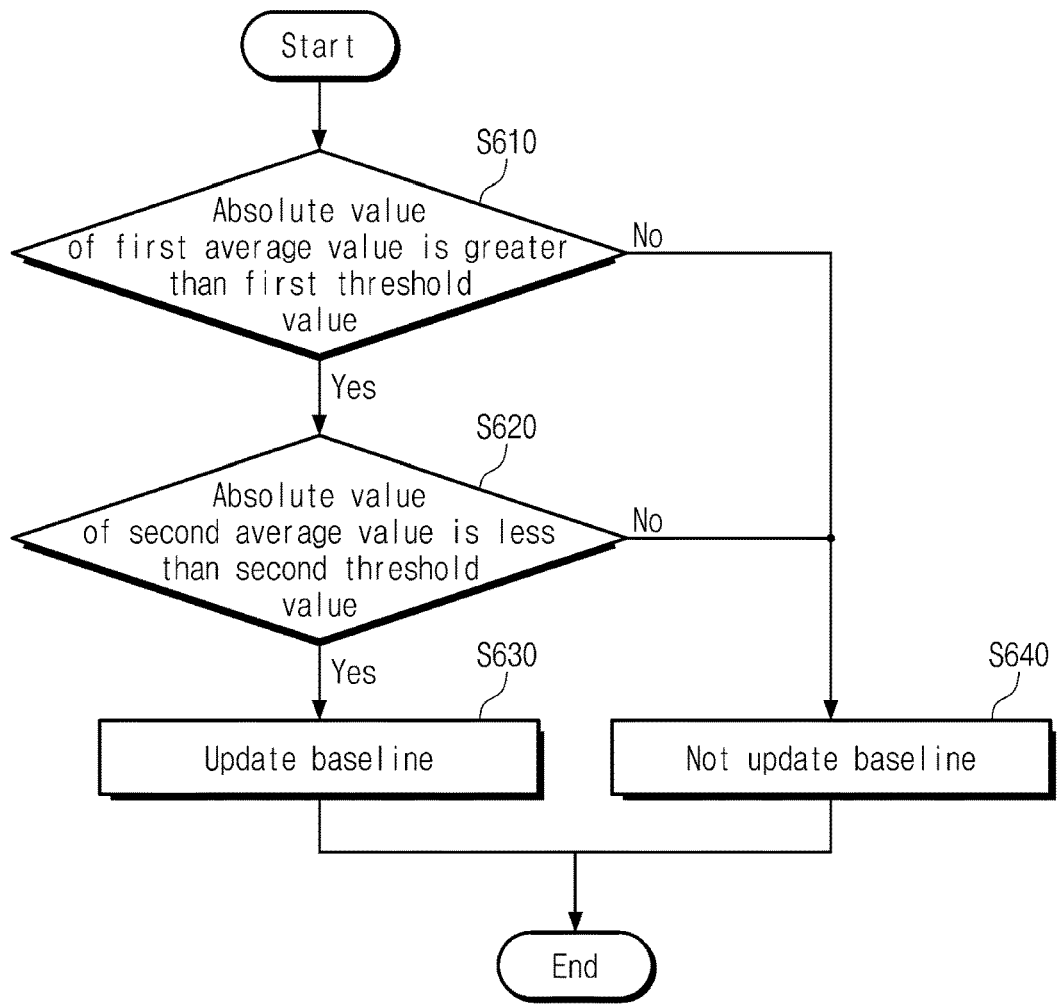
FIG. 9 is a flowchart illustrating an operation of a baseline updater, according to an embodiment of the present disclosure.

FIG. 9 is a flowchart illustrating an operation of a baseline updater, according to an embodiment of the present disclosure.

Referring to FIGS. 7 to 9, the baseline updater 230C1 may determine whether to update a baseline, based on the first average value AG1 and the second average value AG2. The sensor layer (200, see FIG. 6A) may operate for each sensing frame. The baseline updater 230C1 sets the baseline by determining whether the baseline is updated for each sensing frame. In other words, the baseline updater 230C1 establishes the baseline by deciding if it needs updating for each sensing frame A predetermined first threshold value and a predetermined second threshold value for comparison may be set in the baseline updater 230C1. Each of the first threshold value and the second threshold value may be an experimental value and may be based on sensitivity values measured in an external environment of the electronic device 1000 (see FIG. 1). For example, the first threshold value may be defined for determination according to a temperature change of the sensor layer 200 (see FIG. 6A). In other words, the first threshold value might be set to determine if there are temperature fluctuations in the sensor layer 200 (see FIG. 6A). The second threshold value may be defined to determine whether the sensor layer 200 (see FIG. 6A) is touched.

The baseline updater 230C1 may determine whether the absolute value of the first average value AG1 is greater than a first threshold value (S610).

When the absolute value of the first average value AG1 is less than or equal to the first threshold value, the baseline updater 230C1 may not update a baseline BL (S640). For example, the first threshold value may be 20. However, this is an example. For example, the first threshold value according to an embodiment of the present disclosure is an experimental value and may be defined in various ways according to circumstances.

The baseline updater 230C1 may determine a temperature change of the sensor layer 200 (see FIG. 6A) based on the first average value AG1. For example, when the first average value AG1 is less than or equal to 20, a difference value between the plurality of first differential sensitivity values DCMa measured in a first environment at room temperature and the plurality of second differential sensitivity values DCM measured in a second environment is small.

In this case, it may be determined that the temperature of the second environment is not significantly different from that of the room temperature, and the capacitance value measured through the sensor layer 200 (see FIG. 6A) by the external temperature has not changed compared to the capacitance value measured through the sensor layer 200 (see FIG. 6A) at the temperature of the first environment. In this case, the baseline updater 230C1 may not update the baseline BL (S640).

The baseline updater 230C1 may determine whether the absolute value of the second average value AG2 is smaller than a second threshold value (S620). This may happen when the absolute value of the first average value AG1 is greater than the first threshold value.

When the absolute value of the second average value AG2 is greater than or equal to the second threshold value, the baseline updater 230C1 may not update the baseline BL (S640). For example, the second threshold value may be 3. However, this is an example. For example, the second threshold value according to an embodiment of the present disclosure may be an experimental value and may be defined in various ways depending on circumstances.

The baseline updater 230C1 may determine whether there is a touch by the external input 2000 (see FIG. 2) of the sensor layer 200 (see FIG. 6A), based on the second average value AG2. For example, the fact that the second average value AG2 is greater than or equal to 3 may mean that a touch has been applied to at least one node among a plurality of nodes, causing a change in a capacitance value, and thus at least part of the plurality of difference values DDCM has increased compared to other adjacent difference values.

Unlike an embodiment of the present disclosure, when the baseline BL is updated immediately after a touch is made in a low-temperature environment, the baseline may be set with the capacitance value changed by the body temperature of the finger even though the user's finger, which is the external input 2000 (see FIG. 2), is removed from a portion where the touch is made. When this baseline is used for touch determination, a ghost touch phenomenon may occur. The ghost touch phenomenon may refer to a phenomenon in which a touch is detected even though a touch is not actually made by the external input 2000 (see FIG. 2). However, according to an embodiment of the present disclosure, when the second average value AG2 is greater than or equal to 3, the baseline updater 230C1 may determine that a touch has been made in the sensor layer 200 (see FIG. 6A). In this case, the baseline updater 230C1 may not update the baseline BL (S640). The sensor driver 200C (see FIG. 6A) may prevent the ghost touch phenomenon. Accordingly, the electronic device 1000 (see FIG. 1) having improved sensing reliability may be provided.

When the absolute value of the first average value AG1 is greater than a predetermined first threshold value and the absolute value of the second average value AG2 is less than a predetermined second threshold value, the baseline updater 230C1 may update the baseline BL (S630). In other words, only when both the first average value AG1 and the second average value AG2 satisfy a predetermined condition, the baseline updater 230C1 may update the baseline BL.

Unlike an embodiment of the present disclosure, in a low-temperature environment, e.g., lower than a room temperature, the capacitance value sensed by the sensor layer 200 (see FIG. 6A) of the electronic device 1000 (see FIG. 1) may decrease. In this case, when a touch is provided by the external input 2000 (see FIG. 2), the temperature of the user's finger, which is the external input 2000 (see FIG. 2), may increase the temperature of a portion of the sensor layer 200 (see FIG. 6A) where the touch is made. Even when the finger is removed, the temperature is maintained, and thus the value of the capacitance of the touched portion may be instantaneously increased. When the sensor driver 200C updates the baseline for each sensing frame, the baseline may be set while the capacitance value is changed by the body temperature of the user's finger, which is the external input 2000 (see FIG. 2), on the portion where the touch is made. When this baseline is used for touch determination, a ghost touch phenomenon may occur. However, according to an embodiment of the present disclosure, the sensor control circuit 200C1 of the sensor driver 200C (see FIG. 6A) may include the sensitivity value receiver 210C1, the average value calculator 220C1, and the baseline updater 230C1. Thus, only when both a first condition that a temperature change of the sensor layer 200 (see FIG. 6A) is determined, and a second condition that a touch is not detected, are satisfied, the baseline updater 230C1 may update the baseline BL. The sensor driver 200C (see FIG. 6A) may set the baseline BL in consideration of the surrounding environment of the electronic device 1000 (see FIG. 1) by including an algorithm for updating the baseline BL. Accordingly, the electronic device 1000 (see FIG. 1) having improved sensing reliability may be provided.

Figure 10:
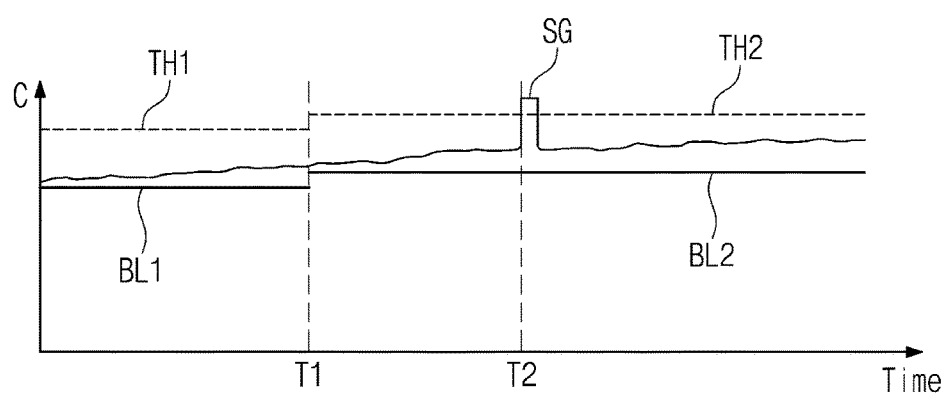
FIG. 10 is a graph illustrating a capacitance value over time, according to an embodiment of the present disclosure.

FIG. 10 is a graph illustrating a capacitance value with time, according to an embodiment of the present disclosure.

Referring to FIGS. 6A, 7, and 10, a horizontal axis of a graph may indicate time, and a vertical axis of the graph may indicate capacitance.

The sensor driver 200C may set a first baseline BL1.

The sensor driver 200C may determine whether there is a touch by comparing a signal SG detected by the sensor layer 200 with the first baseline BL1. In this case, because the signal SG having a first threshold signal TH1 or higher is not provided, the sensor driver 200C may determine that there is no touch. The first threshold signal TH1 may be set based on the first baseline BL1. This process may occur prior to a first time T1.

At the first time T1 when the sensing frame changes, the sensitivity value receiver 210C1 may calculate the plurality of difference values DDCM. For example, the plurality of difference values DDCM at this time may have values in Table 5.

The average value calculator 220C1 may calculate the first average value AG1 and the second average value AG2. For example, referring to the Table 5, because the first average value AG1 is −46.4, the absolute value of the first average value AG1 may be greater than the first threshold value of 20. Moreover, because the second average value AG2 is −0.35, the absolute value of the second average value AG2 may be smaller than the second threshold value of 3. In this case, the baseline updater 230C1 may update the first baseline BL1 to a second baseline BL2.

According to an embodiment of the present disclosure, the sensor control circuit 200C1 of the sensor driver 200C may include the sensitivity value receiver 210C1, the average value calculator 220C1, and the baseline updater 230C1. Thus, only when both a first condition that a temperature change of the sensor layer 200 is determined and a second condition that a touch is not detected are satisfied, the baseline updater 230C1 may update the second baseline BL2. The sensor driver 200C (see FIG. 6A) may set the first baseline BL1 or the second baseline BL2 in consideration of the surrounding environment of the electronic device 1000 (see FIG. 1) by including an algorithm for updating the first baseline BL1 or the second baseline BL2. Accordingly, the electronic device 1000 (see FIG. 1) having improved sensing reliability may be provided.

A second threshold signal TH2 may be set by the second baseline BL2.

At a second time T2, the external input 2000 (see FIG. 2) may be provided to the electronic device 1000 (see FIG. 1). The sensor layer 200 may detect the signal SG exceeding the second threshold signal TH2. At this time, the sensor driver 200C may determine that there is a touch.

Unlike an embodiment of the present disclosure, when the baseline BL1 or BL2 is not updated, the signal SG may be increased by a capacitance value changed depending on the external environment. At this time, as the signal SG increases, a change amount ratio of capacitance may decrease compared with the first baseline BL1. As a result, the sensing sensitivity of the sensor layer 200 may be reduced. However, according to an embodiment of the present disclosure, the electronic device 1000 (see FIG. 1) may update the second baseline BL2 depending on a driving method for updating a baseline in consideration of the external environment. The change amount ratio of capacitance is increased compared with the baseline by updating the second baseline BL2, thereby improving sensing sensitivity. Accordingly, the electronic device 1000 (see FIG. 1) having improved sensing reliability may be provided.

As described above, only when both a first condition, under which a temperature change of a sensor layer is determined, and a second condition under which no touch is sensed are satisfied, a sensor driver may update a baseline. The sensor driver may set the baseline in consideration of a surrounding environment of an electronic device by incorporating an algorithm for updating the baseline. Accordingly, it is possible to provide an electronic device having improved sensing reliability, a sensor driver, and an operating method of an electronic device.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An electronic device comprising: a display layer configured to display an image, a sensor layer disposed on the display layer and including a plurality of electrodes arranged in a first direction and a plurality of cross electrodes arranged in a second direction crossing the first direction; a memory configured to store a plurality of first sensitivity values and a plurality of first differential sensitivity values, wherein the plurality of first sensitivity values are calculated from a plurality of nodes respectively provided in areas where the plurality of electrodes intersect the plurality of cross electrodes in a first environment, and the plurality of first differential sensitivity values are calculated from a difference between first sensitivity values, which are adjacent to each other, from among the plurality of first sensitivity values; and a sensor driver configured to calculate a plurality of second sensitivity values from the plurality of nodes in a second environment and to calculate a plurality of second differential sensitivity values, wherein the plurality of second differential values are calculated from a difference between second sensitivity values, which are adjacent to each other, from among the plurality of second sensitivity values, wherein the sensor driver is configured to calculate a plurality of difference values between the plurality of first differential sensitivity values and the plurality of second differential sensitivity values, respectively; calculate a first average value of a first row or column of values among the plurality of difference values; and calculate a second average value of remaining values among the plurality of difference values, wherein the remaining values were not used in the first average value calculation, and wherein the sensor driver determines whether to update a baseline, based on the first average value and the second average value, wherein, when an absolute value of the first average value is greater than a predetermined first threshold value, and an absolute value of the second average value is less than a predetermined second threshold value, the sensor driver updates the baseline.

2. The electronic device of claim 1, wherein the sensor driver determines whether there is a touch, by comparing a signal sensed in the sensor layer with the baseline.

3. The electronic device of claim 1, wherein the first environment is an environment having a first temperature, and the second environment is an environment having a second temperature different from the first temperature.

4. The electronic device of claim 1, wherein, when the absolute value of the first average value is less than or equal to the first threshold value, the sensor driver does not update the baseline.

5. The electronic device of claim 1, wherein, when the absolute value of the second average value is greater than or equal to the second threshold value, the sensor driver does not update the baseline.

6. The electronic device of claim 1, wherein the sensor driver determines a temperature change of the sensor layer based on the first average value.

7. The electronic device of claim 6, wherein the sensor driver determines whether there is a touch of the sensor layer, based on the second average value.

8. The electronic device of claim 7, wherein, when the temperature change is determined, and the touch is not sensed, the sensor driver updates the baseline.

9. A sensor driver configured to drive a sensor layer including a plurality of electrodes and a plurality of cross electrodes respectively intersecting the plurality of electrodes, the sensor driver comprising: a sensitivity value receiver configured to calculate a plurality of sensitivity values and a plurality of differential sensitivity values, wherein the plurality of sensitivity values are calculated from a plurality of nodes respectively provided in areas where the plurality of electrodes intersect the plurality of cross electrodes, and the plurality of differential sensitivity values are calculated from a difference between sensitivity values adjacent to each other from among the plurality of sensitivity values; an average value calculator configured to: calculate a plurality of difference values between a plurality of first differential sensitivity values calculated in a first environment among the plurality of differential sensitivity values, and a plurality of second differential sensitivity values calculated in a second environment different from the first environment among the plurality of differential sensitivity values; calculate a first average value of a first row or column of values among the plurality of difference values; and calculate a second average value of remaining values among the plurality of difference values, wherein the remaining values were not used in the first average value calculation; and a baseline updater configured to determine whether to update a baseline, based on the first average value and the second average value, wherein, when an absolute value of the first average value is greater than a predetermined first threshold value, and an absolute value of the second average value is less than a predetermined second threshold value, the baseline updater updates the baseline.

10. The sensor driver of claim 9, wherein, when the absolute value of the first average value is less than or equal to the first threshold value, the baseline updater does not update the baseline.

11. The sensor driver of claim 9, wherein, when the absolute value of the second average value is greater than or equal to the second threshold value, the baseline updater does not update the baseline.

12. The sensor driver of claim 9, wherein the baseline updater determines a temperature change of the sensor layer based on the first average value.

13. The sensor driver of claim 12, wherein the baseline updater determines whether there is a touch of the sensor layer, based on the second average value.

14. The sensor driver of claim 13, wherein, when the temperature change is determined, and the touch is not sensed, the baseline updater updates the baseline.

15. A driving method of an electronic device, the method comprising: measuring, by a sensor layer including a plurality of electrodes and a plurality of cross electrodes respectively intersecting the plurality of electrodes, a plurality of first sensitivity values calculated from a plurality of nodes provided in areas where the plurality of electrodes intersect the plurality of cross electrodes in a first environment; storing a plurality of first differential sensitivity values calculated from a difference between first sensitivity values adjacent to each other from among the plurality of first sensitivity values; measuring a plurality of second sensitivity values from the plurality of nodes in a second environment different from the first environment and calculating a plurality of second differential sensitivity values, wherein the plurality of second differential sensitivity values are calculated from a difference between second sensitivity values, which are adjacent to each other, from among the plurality of second sensitivity values; calculating a plurality of difference values between the plurality of first differential sensitivity values and the plurality of second differential sensitivity values, respectively, and calculating a first average value of a first row or column of values among the plurality of difference values and a second average value of remaining values among the plurality of difference values, wherein the remaining values were not used in the first average value calculation; and determining whether to update a baseline, based on the first average value and the second average value, wherein the determining of whether to update the baseline includes: when an absolute value of the first average value is greater than a predetermined first threshold value, and an absolute value of the second average value is less than a predetermined second threshold value, updating the baseline.

16. The method of claim 15, wherein the determining of whether to update the baseline further includes:
when the absolute value of the first average value is less than or equal to the first threshold value, not updating the baseline.

17. The method of claim 16, wherein the determining of whether to update the baseline further includes:
when the absolute value of the second average value is greater than or equal to the second threshold value, not updating the baseline.

* * * * *